United States Patent
Tanabe et al.

(10) Patent No.: US 12,454,681 B2
(45) Date of Patent: Oct. 28, 2025

(54) ERYTHROCYTE REMOVAL DEVICE, MONONUCLEAR CELL COLLECTOR, CELL CULTURE DEVICE, CELL CULTURE SYSTEM, CELL CULTURE METHOD, AND MONONUCLEAR CELL COLLECTION METHOD

(71) Applicants: I Peace, Inc., Palo Alto, CA (US); Koji Tanabe, Palo Alto, CA (US)

(72) Inventors: Koji Tanabe, Palo Alto, CA (US); Ryoji Hiraide, Kyoto (JP); Kenta Suto, Palo Alto, CA (US)

(73) Assignee: I Peace, Inc., Palo Alto, CA (US)

( * ) Notice: Subject to any disclaimer, the term of this patent is extended or adjusted under 35 U.S.C. 154(b) by 904 days.

(21) Appl. No.: 17/617,876

(22) PCT Filed: Jun. 10, 2020

(86) PCT No.: PCT/JP2020/022839
§ 371 (c)(1),
(2) Date: Dec. 9, 2021

(87) PCT Pub. No.: WO2020/250927
PCT Pub. Date: Dec. 17, 2020

(65) Prior Publication Data
US 2022/0306993 A1 Sep. 29, 2022

Related U.S. Application Data

(60) Provisional application No. 62/859,307, filed on Jun. 10, 2019.

(51) Int. Cl.
*C12N 5/074* (2010.01)
*C12N 5/00* (2006.01)

(52) U.S. Cl.
CPC ......... *C12N 5/0696* (2013.01); *C12N 5/0087* (2013.01); *C12N 2501/602* (2013.01); *C12N 2501/603* (2013.01); *C12N 2501/604* (2013.01); *C12N 2501/606* (2013.01); *C12N 2506/11* (2013.01)

(58) Field of Classification Search
None
See application file for complete search history.

(56) References Cited

U.S. PATENT DOCUMENTS

| | | | |
|---|---|---|---|
| 8,048,999 B2 | 11/2011 | Yamanaka et al. | |
| 2014/0335608 A1 | 11/2014 | Tanaka et al. | |
| 2015/0306641 A1 | 10/2015 | Suzuki et al. | |
| 2016/0215257 A1 | 7/2016 | Davis et al. | |
| 2018/0142200 A1 | 5/2018 | Mason et al. | |
| 2018/0245041 A1 | 8/2018 | Tanabe et al. | |
| 2018/0273891 A1 | 9/2018 | Tanabe et al. | |
| 2019/0376084 A1 | 12/2019 | Crisman et al. | |
| 2019/0382706 A1 | 12/2019 | Tanabe et al. | |

FOREIGN PATENT DOCUMENTS

| | | | | |
|---|---|---|---|---|
| CN | 108138113 A | 6/2018 | | |
| CN | 108138130 A | 6/2018 | | |
| EP | 3399027 A1 | * 11/2018 | ............. | A61K 35/15 |
| JP | 4183742 B1 | 11/2008 | | |
| JP | 2014-114997 A | 6/2014 | | |
| JP | 2017-535282 A | 11/2017 | | |
| JP | 2018-061519 A | 4/2018 | | |
| JP | 2019-509047 A | 4/2019 | | |
| JP | 2019-080575 A | 5/2019 | | |
| WO | 2018/015561 A1 | 1/2018 | | |
| WO | 2018/015954 A9 | 2/2018 | | |
| WO | 2018/087558 A1 | 5/2018 | | |

OTHER PUBLICATIONS

Kropp C, Kempf H, Halloin C, Robles-Diaz D, Franke A, Scheper T, Kinast K, Knorpp T, Joos TO, Haverich A, Martin U, Zweigerdt R, Olmer R. Impact of Feeding Strategies on the Scalable Expansion of Human Pluripotent Stem Cells in Single-Use Stirred Tank Bioreactors. Stem Cells Transl Med. 2016 (Year: 2016).*

Brecht, R. (May 25, 2018). Bioreactor. Pharma IQ. https://www.pharma-iq.com/glossary/bioreactor#:~:text=A (Year: 2018).*

Lachmann, Nico, et al. "Gene Correction of Human Induced Pluripotent Stem Cells Repairs the Cellular Phenotype in Pulmonary Alveolar Proteinosis." American Journal of Respiratory and Critical Care Medicine, vol. 189, No. 2, Jan. 15, 2014, pp. 167-182, https://doi.org/10.1164/rccm.201306-1012oc. (Year: 2014).*

Okiyoneda, Tsukasa et al. "Gene Transfer Method Using Adenovirus", Folia Pharmacologica Japonica, Mar. 8, 2002, vol. 119, pp. 337-344.

"Gene Transfer Experiment Handbook", Clontech TaKaRa cellartis, Takara Bio Inc., Oct. 2017, pp. 1-14.

Seki, Tomohisa et al., "Generating induced pluripotent stem cells from terminally differentiated human peripheral T cells", Journal of clinical and experimental medicine, Dec. 31, 2011, vol. 239 No. 14, pp. 1320-1325.

(Continued)

*Primary Examiner* — Anna Skibinsky
*Assistant Examiner* — Catherine L McCormick
(74) *Attorney, Agent, or Firm* — Studebaker Brackett PLLC

(57) ABSTRACT

Provided is a cell culture method including introducing a factor into cells in a cell culture vessel, and culturing the cells into which the factor has been introduced in the same cell culture vessel. Also provided is a mononuclear cell collection method including treating blood to prepare a treated blood from which erythrocytes have been at least partially removed, diluting the treated blood, causing sedimentation of mononuclear cells contained in the diluted treated blood, removing the supernatant from the diluted treated blood, and collecting the mononuclear cells.

12 Claims, 18 Drawing Sheets

(56) References Cited

OTHER PUBLICATIONS

Ficoll-Paque(TM) Premium, "Instructions 28-4039-56AE Cell Preparation Media", GE Healthcare Bio-Sciences AB, Oct. 15, 2005, pp. 1-15.

International Search Report issued in PCT/JP2020/022839; mailed Aug. 25, 2020.

"Animal Cell Culture Guidelines (III)", CellMax Fetal Bovine Serum, CellMax, Jan. 17, 2018, pp. 1-9; with English language concise explanation.

Thermo Fisher Scientific [online], "Subculturing Suspension Cells", Apr. 3, 2019, URL: https://web.archive.org/web/20190403064946/https://www.https://www.thermofisher.com/us/en/home/references/gibco-cell-culture-basics/cell-culture-protocols/subculturing-suspension-cells.html, total 4 pages.

* cited by examiner

TRA-1-60

TRA-1-60

TRA-1-60

ERYTHROCYTE REMOVAL DEVICE, MONONUCLEAR CELL COLLECTOR, CELL CULTURE DEVICE, CELL CULTURE SYSTEM, CELL CULTURE METHOD, AND MONONUCLEAR CELL COLLECTION METHOD

TECHNICAL FIELD

The present invention relates to cell technology, and to an erythrocyte removal device, a mononuclear cell collector, a cell culture device, a cell culture system, a cell culture method, and a mononuclear cell collection method.

BACKGROUND ART

Embryonic stem cells (ES cells) are stem cells that have been established from human or mouse early embryos. ES cells have pluripotency, allowing them to differentiate into any of cells present in the living body. At present, human ES cells can be used in cell transplant therapy for treating a number of diseases including Parkinson's disease, juvenile onset diabetes, and leukemia. However, there are barriers to ES cell transplantation. In particular, ES cell transplantation may cause immune rejection reactions similar to the rejection reactions that occur after unsuccessful organ transplantation. From an ethical point of view, there are also many criticisms and objections to the use of ES cells that have been established by destroying human embryos.

Under these circumstances, Professor Shinya Yamanaka of Kyoto University succeeded in establishing induced pluripotent stem cells (iPS cells) by introducing four genes, namely the OCT3/4, KLF4, c-MYC and SOX2 genes, into somatic cells. For this, Professor Yamanaka received the Nobel Prize in Physiology or Medicine in 2012 (see for example Patent Documents 1 and 2). iPS cells are ideal pluripotent cells that are not subject to rejection reactions or ethical concerns. Consequently, iPS are expected to be used for cell transplantation therapy.

CITATION LIST

Patent Documents

Patent Document 1: Japanese Patent No. 4183742
Patent Document 2: Patent Publication JP-A-2014-114997

SUMMARY

Technical Problem iPS cells may be induced from blood cells. Technologies for efficiently processing blood cells are also desired for applications not limited to inducing iPS cells. Devices are also in demand for efficiently culturing a variety of cells not limited to iPS cells. It is therefore an object of the present invention to provide an erythrocyte removal device, a mononuclear cell collector, a cell culture device, a cell culture system, a cell culture method, and a mononuclear cell collection method.

Solution to Problem

Embodiments of the present invention provide an erythrocyte removal device comprising a blood container that holds blood, an erythrocyte removal vessel that receives blood from the blood container and removes the erythrocytes at least partially from the blood, and a flow channel for transporting at least blood from the blood container to the erythrocyte removal vessel.

In the erythrocyte removal device, the interior of the flow channel for transporting blood from the blood container to the erythrocyte removal vessel may be capable of being closed off from the outside air.

The erythrocyte removal device may further comprise a mononuclear cell collector that receives treated blood from which the erythrocytes have been at least partially removed from the erythrocyte removal vessel and collects the mononuclear cells from the treated blood, and a flow channel for transporting at least the treated blood from which the erythrocytes have been at least partially removed from the erythrocyte removal vessel to the mononuclear cell collector.

In the erythrocyte removal device, the erythrocyte removal vessel may be capable of removing a gas from the interior of the erythrocyte removal vessel.

The erythrocyte removal device may further comprise a flow channel for the treated blood from which the erythrocytes have been at least partially removed, and the interior of the flow channel for the treated blood from which the erythrocytes have been at least partially removed may be capable of being closed off from the outside air.

In the erythrocyte removal device, the mononuclear cell collector may be capable of removing a gas from the interior of the mononuclear cell collector.

In the erythrocyte removal device, the interior of the blood container and the interior of the erythrocyte removal vessel may be capable of being closed off from the outside air.

In the erythrocyte removal device, the interior of the mononuclear cell collector may be capable of being closed off from the outside air.

In the erythrocyte removal device, the enclosed space including the interior of the blood container and the interior of the erythrocyte removal vessel may not exchange gas with the outside.

In the erythrocyte removal device, the blood container and erythrocyte removal vessel may be embedded.

In the erythrocyte removal device, at least part of the blood container and/or at least part of the erythrocyte removal vessel may be formed by being engraved into a member.

In the erythrocyte removal device, the mononuclear cell collector may be embedded.

In the erythrocyte removal device, at least part of the mononuclear cell collector may be formed by being engraved into a member.

In the erythrocyte removal device, blood may be mixed with at least one of an erythrocyte sedimentation agent and an erythrocyte removal agent in the erythrocyte removal vessel.

The erythrocyte removal device may further comprise an erythrocyte treatment agent container that holds at least one of the erythrocyte sedimentation agent and erythrocyte removal agent, and the erythrocyte removal vessel may receive at least one of the erythrocyte sedimentation agent and erythrocyte removal agent from the erythrocyte treatment agent container.

The erythrocyte removal device may further comprise a mixing unit for mixing blood with at least one of the erythrocyte sedimentation agent and erythrocyte removal agent, and blood that has been mixed with at least one of the erythrocyte sedimentation agent and erythrocyte removal agent may be received by the erythrocyte removal vessel from the mixing unit.

The erythrocyte removal device may comprise a bent flow channel through which a mixture of blood and at least one of the erythrocyte sedimentation agent and erythrocyte removal agent flows.

The erythrocyte removal device may further comprise a flow channel for transporting at least blood from the blood container to the erythrocyte removal vessel.

The erythrocyte removal device may comprise a vacuum container the interior of which can be made into a vacuum, and which is connected to the flow channel for transporting at least blood from the blood container to the erythrocyte removal vessel.

The erythrocyte removal device may further comprise an erythrocyte treatment agent container that holds at least one of the erythrocyte sedimentation agent and erythrocyte removal agent, together with a flow channel for transporting at least one of the erythrocyte sedimentation agent and erythrocyte removal agent from the erythrocyte treatment agent container to the erythrocyte removal vessel.

The erythrocyte removal device may further comprise a fluid machinery for transporting at least blood from the blood container to the erythrocyte removal vessel.

In the erythrocyte removal device, the blood container may be capable of changing the volume of the blood container.

In the erythrocyte removal device, the erythrocyte removal vessel may be capable of changing the volume of the erythrocyte removal vessel.

In the erythrocyte removal device, the mononuclear cell collector may be capable of changing the volume of the mononuclear cell collector.

In the erythrocyte removal device, the erythrocyte treatment agent container may be capable of changing the volume of the erythrocyte treatment agent container.

In the erythrocyte removal device, the erythrocytes may be sedimented in the erythrocyte removal vessel and the supernatant in the erythrocyte removal vessel may then be sent to the mononuclear cell collector as treated blood from which erythrocytes have been at least partially removed.

The erythrocyte removal device may further comprise a flow channel for transporting at least the treated blood from which erythrocytes have been at least partially removed from the erythrocyte removal vessel to the mononuclear cell collector.

The erythrocyte removal device may further comprise a fluid machinery for transporting at least the treated blood from which erythrocytes have been at least partially removed from the erythrocyte removal vessel to the mononuclear cell collector.

In the erythrocyte removal device, the treated blood from which erythrocytes have been at least partially removed may be diluted in the mononuclear cell collector.

In the erythrocyte removal device, the mononuclear cells may be sedimented in the mononuclear cell collector.

In the erythrocyte removal device, platelets may float in a diluted solution of the treated blood.

In the erythrocyte removal device, the erythrocytes may be hemolyzed by an erythrocyte removal agent in a diluted solution of the treated blood.

The erythrocyte removal device may further comprise a liquid diluent container holding a diluting liquid for diluting the treated blood from which erythrocytes have been at least partially removed.

In the erythrocyte removal device, the diluting liquid may be a buffer solution.

In the erythrocyte removal device, the liquid diluent container may be capable of changing the volume of the liquid diluent container.

In the erythrocyte removal device, the supernatant in the mononuclear cell collector may be removed after the mononuclear cells have been sedimented in the mononuclear cell collector.

In the erythrocyte removal device, the platelets floating in the supernatant may be removed by removing the supernatant.

In the erythrocyte removal device, hemolyzed erythrocyte components floating in the supernatant may be removed by removing the supernatant.

In the erythrocyte removal device, a first opening may be provided at the bottom of the mononuclear cell collector, and a second opening may be provided at a position higher than the first opening in the direction of gravity.

In the erythrocyte removal device, the bottom of the mononuclear cell collector may be funnel shaped, the first opening may be provided at the tip of the funnel-shaped bottom, and the second opening may be provided on the side of the funnel-shaped bottom.

In the erythrocyte removal device, the mononuclear cells may accumulate at the bottom and the supernatant may be discharged from the second opening when treated blood from which erythrocytes have been at least partially removed is introduced into the mononuclear cell collector.

In the erythrocyte removal device, the platelets floating in the supernatant may be removed by discharging the supernatant.

In the erythrocyte removal device, hemolyzed erythrocyte components floating in the supernatant may be removed by discharging the supernatant.

The erythrocyte removal device may further comprise a mononuclear cell suction device that suctions mononuclear cells from the first opening.

In the erythrocyte removal device, the size of the first opening may be set so that the mononuclear cells clog the first opening when mononuclear cells are not suctioned by the mononuclear cell suction device.

The erythrocyte removal device may further comprise a flow channel for transporting a fluid in the erythrocyte removal vessel to the blood container.

The erythrocyte removal device may further comprise a fluid machinery for transporting at least blood from the blood container to the erythrocyte removal vessel and/or a fluid machinery for transporting a fluid in the erythrocyte removal vessel to the blood container.

The erythrocyte removal device may further comprise a flow channel for transporting a fluid in the mononuclear cell collector to the erythrocyte removal vessel.

The erythrocyte removal device may further comprise a fluid machinery for transporting at least treated blood from which the erythrocytes have been at least partially removed from the erythrocyte removal vessel to the mononuclear cell collector and/or a fluid machinery for transporting a fluid in the mononuclear cell collector to the erythrocyte removal vessel.

Embodiments of the present invention provide a mononuclear cell collector comprising a collection container that holds a solution containing mononuclear cells, wherein the bottom of the collection container is funnel shaped, a first opening is provided at the tip of the funnel-shaped bottom, and a second opening is provided on the side of the funnel-shaped bottom.

In the mononuclear cell collector, mononuclear cells may accumulate in the tip of the funnel-shaped bottom and a solution may be discharged from the second opening when a solution is introduced into the collection container.

The mononuclear cell collector may further comprise a mononuclear cell suction device that suctions mononuclear cells that have accumulated in the tip of the funnel-shaped bottom.

In the mononuclear cell collector, the size of the first opening may be set so that the mononuclear cells clog the first opening when mononuclear cells are not suctioned by the mononuclear cell suction device.

Embodiments of the present invention provide a cell culture device comprising a cell culture vessel for culturing cells and a variable volume container connected to the cell culture vessel, wherein a fluid can move through the cell culture vessel and the variable volume container.

The cell culture device may further comprise at least a first variable volume container and a second variable volume container as the variable volume container.

In the cell culture device, the volume of the first variable volume container may expand and the volume of the second variable volume container may contract when a fluid in the cell culture vessel moves to the interior of the first variable volume container.

In the cell culture device, the volume of the first variable volume container may contract and the volume of the second variable volume container may expand when a fluid in the first variable volume container moves to the interior of the cell culture vessel.

In the cell culture device, the volume of the second variable volume container may contract and the volume of the first variable volume container may expand when a fluid in the second variable volume container moves to the interior of the cell culture vessel.

In the cell culture device, the interior of the cell culture vessel, the interior of the first variable volume container and the interior of the second variable volume container may be capable of being closed off from the outside air.

In the cell culture device, the cell culture vessel, the first variable volume container and the second variable volume container may be embedded.

In the cell culture device, at last part of the cell culture vessel, at least part of the first variable volume container and at least part of the second variable volume container may be formed by being engraved into a member.

In the cell culture device, the first variable volume container may hold a substance, and the substance may be brought into contact with cells by the movement of a fluid.

In the cell culture device, the substance may be an induction factor, and the induction factor may be introduced into cells by the movement of a fluid.

The cell culture device may further comprise a fluid machinery for transporting a fluid in the cell culture vessel to the first variable volume container.

The cell culture device may further comprise a fluid machinery for transporting a fluid in the cell culture vessel to the second variable volume container.

The cell culture device may further comprise a flow channel for supplying cells to the interior of the cell culture vessel.

The cell culture device may further comprise a flow channel for supplying a culture solution, connected to the flow channel for supplying cells to the interior of the cell culture vessel.

In the cell culture device, cells and culture solution may be mixed inside the flow channel for supplying cells to the interior of the cell culture vessel, and the culture solution containing the cells may then be supplied to the cell culture vessel.

In the cell culture device, the volume of at least one of the first variable volume container and the second variable volume container may expand when cells are introduced into the cell culture vessel from the flow channel for supplying cells.

The cell culture device may further comprise a fluid machinery for supplying cells to the interior of the cell culture vessel.

In the cell culture device, the cells may be somatic cells or stem cells.

The cell culture device may further comprise a fluid container for holding a fluid to be supplied to the interior of the cell culture vessel.

In the cell culture device, the fluid may be a somatic cell medium or stem cell medium.

In the cell culture device, the stem cell medium may be an induction culture medium, expansion culture medium or maintenance culture medium.

In the cell culture device, the volume of at least one of the first variable volume container and the second variable volume container may expand when a fluid is supplied from the fluid container to the interior of the cell culture vessel.

The cell culture device may further comprise a fluid machinery for supplying a fluid to the interior of the cell culture vessel.

The cell culture device may further comprise a temperature regulator for regulating the temperature inside the cell culture vessel.

In the cell culture device, cells may be adhesion cultured in the cell culture vessel.

In the cell culture device, the interior of the cell culture vessel may be coated with a cell adhesive coating agent.

In the cell culture device, cells may be float cultured in the cell culture vessel.

The cell culture device may further comprise a hollow fiber membrane disposed inside the cell culture vessel.

In the cell culture device, cells may be cultured inside the hollow fiber membrane.

In the cell culture device, the cells inside the cell culture vessel may be allowed to move to the variable volume container.

The cell culture device may further comprise a flow channel connected to the cell culture vessel and a fluid machinery provided in the flow channel, and the fluid machinery may suction cells from inside the cell culture vessel into the flow channel and return cells from inside the flow channel to the cell culture vessel to perform at least one of cell passage and expansion culture.

In the cell culture device, the flow channel may have a structure that divides cell masses.

Embodiments of the present invention provide a cell culture system comprising a mononuclear cell collector that collects mononuclear cells from blood and a cell culture vessel that receives mononuclear cells from the mononuclear cell collector.

In the cell culture system, the mononuclear cell collector may receive treated blood from which the erythrocytes have been at least partially removed and collect mononuclear cells from this treated blood.

The cell culture system may further comprise an erythrocyte removal vessel for supplying treated blood from which the erythrocytes have been at least partially removed to the mononuclear cell collector.

The cell culture system may further comprise a blood container for supplying blood to the erythrocyte removal vessel before at least partial removal of the erythrocytes.

The cell culture system may further comprise a variable volume container connected to the cell culture vessel, and the volume of the variable volume container may expand when a fluid inside the cell culture vessel moves to the variable volume container.

The cell culture system may further comprise a first variable volume container connected to the cell culture vessel and a second variable volume container connected to the cell culture vessel, and the volume of the first variable volume container may expand and the volume of the second variable volume container may contract when a fluid in the cell culture vessel moves to the interior of the first variable volume container.

In the cell culture system, the interior of the mononuclear cell collector and the interior of the cell culture vessel may be capable of being closed off from the outside air.

In the cell culture system, the interior of the erythrocyte removal vessel may be capable of being closed off from the outside air.

In the cell culture system, the interior of the blood container may be capable of being closed off from the outside air.

In the cell culture system, the interior of the first variable volume container and the interior of the second variable volume container may be capable of being closed off from the outside air.

In the cell culture system, the blood container, the erythrocyte removal vessel, the mononuclear cell collector, and the cell culture vessel may be embedded.

In the cell culture system, at least part of the blood container, at least part of the erythrocyte removal vessel, at least part of the mononuclear cell collector, and at least part of the cell culture vessel may be formed by being engraved into a member.

In the cell culture system, the first variable volume container and the second variable volume container may be embedded.

In the cell culture system, at least part of the first variable volume container and at least part of the second variable volume container may be formed by being engraved into a member.

In the cell culture system, the interior of the first variable volume container or the interior of the second variable volume container may not exchange gas with the outside.

Embodiments of the present invention provide a cell culture method including introducing a factor into cells in a cell culture vessel, and culturing cells having the introduced factor in the same cell culture vessel.

In the cell culture method, the cell culture vessel may be closed while the factor is being introduced into the cells and the cells with the introduced factor are being cultured.

In the cell culture method, a variable volume container may be connected to the cell culture vessel, and a fluid may move through the cell culture vessel and the variable volume container.

In the cell culture method, the factor may be supplied from the variable volume container.

In the cell culture method, cells in a second state may be induced from cells in a first state into which an introduced factor has been introduced in the same cell culture vessel.

In the cell culture method, the first state may be a differentiated state, and the second state may be an undifferentiated state.

In the cell culture method, the first state may be a dedifferentiated state, and the second state may be a differentiated state.

In the cell culture method, the first state may be a dedifferentiated state, and the second state may be a dedifferentiated state different from the first state.

In the cell culture method, the cells in the first state may be somatic cells.

In the cell culture method, the cells in the first state may be blood cells.

In the cell culture method, the cells in the first state may be mononuclear cells.

In the cell culture method, the cells in the second state may be stem cells.

In the cell culture method, the cells in the second state may be iPS cells.

In the cell culture method, the cells in the first state may be stem cells.

In the cell culture method, the cells in the first state may be iPS cells.

In the cell culture method, the cells in the second state may be somatic cells.

In the cell culture method, the cells in the first state may be somatic cells, and the cells in the second state may be somatic cells different from the cells in the first state.

In the cell culture method, the cells in the first state may be blood cells from which the erythrocytes have been at least partially removed.

In the cell culture method, the cells in the first state may be blood cells from which the platelets have been at least partially removed.

In the cell culture method, the factor may be a factor that induces cells in the second state from cells in the first state.

In the cell culture method, the factor may be a factor that induces a specific cell state.

In the cell culture method, the factor may be an initialization factor.

In the cell culture method, the factor may be a differentiation induction factor.

In the cell culture method, cell passage or expansion culture may be accomplished by collecting factor-introduced cells from the cell culture vessel and returning cells to the same cell culture vessel.

Embodiments of the present invention provide a mononuclear cell collection method that includes treating blood to prepare a treated blood from which erythrocytes have been at least partially removed, diluting the treated blood, causing sedimentation of mononuclear cells contained in the diluted treated blood, removing the supernatant from the diluted treated blood, and collecting the mononuclear cells.

In the mononuclear cell collection method, the treated blood may be prepared in an erythrocyte removal vessel, and dilution of the treated blood, sedimentation of the mononuclear cells and removal of the supernatant may be performed in a mononuclear cell collector, and the erythrocyte removal vessel and mononuclear cell collector may be in a closed state.

In the mononuclear cell collection method, the blood may be treated with an erythrocyte sedimentation agent or erythrocyte removal agent.

In the mononuclear cell collection method, the treated blood may also be diluted with a phosphate buffer.

In the mononuclear cell collection method, the supernatant of the diluted treated blood may also contain platelets.

In the mononuclear cell collection method, erythrocytes may have been at least partially removed from the collected mononuclear cells.

In the mononuclear cell collection method, platelets may have been at least partially removed from the collected mononuclear cells.

Advantageous Effects of Invention

The present invention makes it possible to provide an erythrocyte removal device, a mononuclear cell collector, a cell culture device, a cell culture system, a cell culture method, and a mononuclear cell collection method.

DESCRIPTION OF EMBODIMENTS

Embodiments of the present invention are explained below. In descriptions of the drawings below, parts that are the same or similar are represented by the same or similar symbols. However, the drawings are schematic. Consequently, specific dimensions and the like should be judged in light of the following explanations. Furthermore, it goes without saying that the drawings include elements with different dimensional relationships and ratios.

First Embodiment

Figure 1:
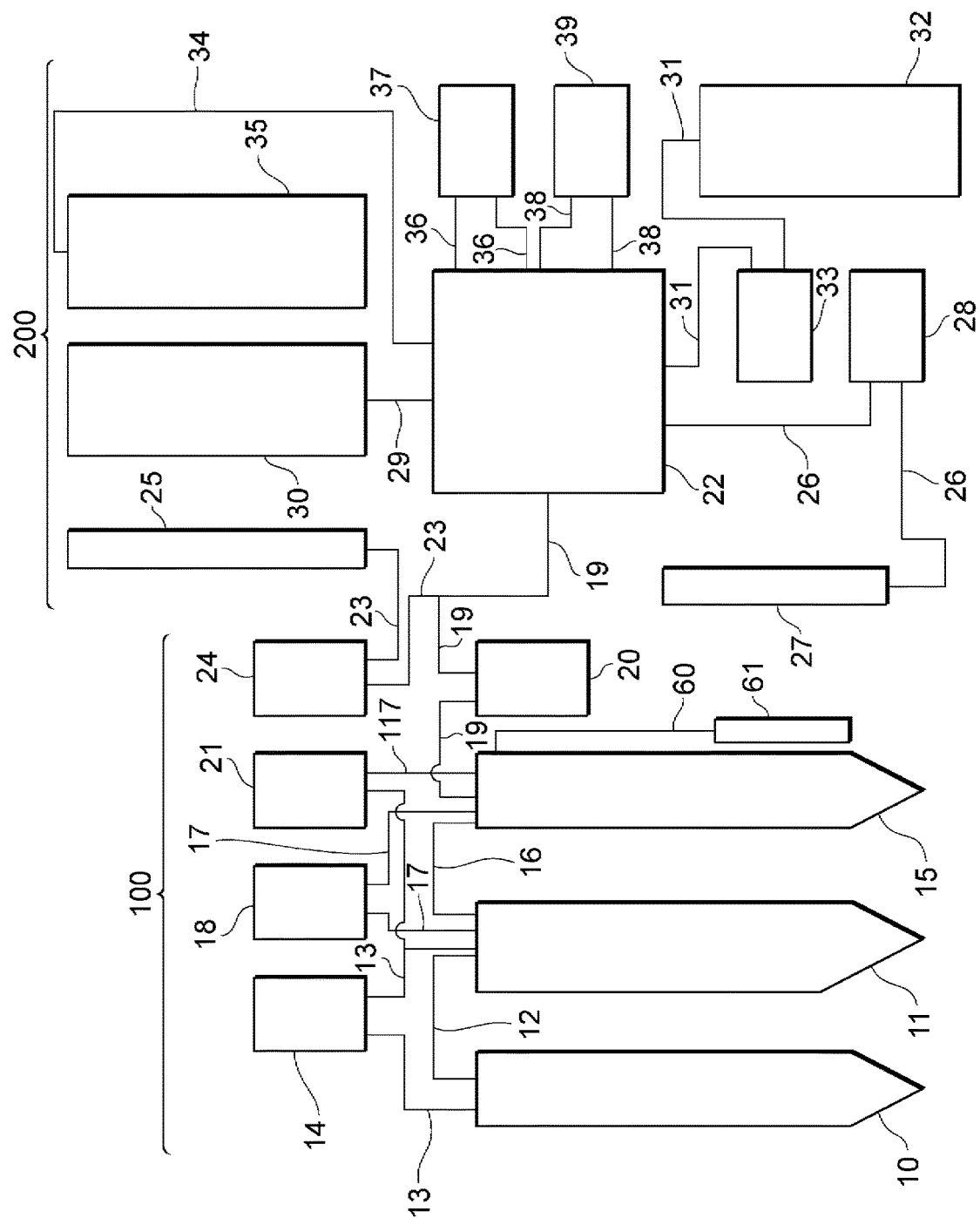
FIG. 1 is a schematic view of a cell culture system according to a first embodiment.

As shown in FIG. 1, an erythrocyte removal device 100 according to the first embodiment comprises a blood container 10 that holds blood and an erythrocyte removal vessel 11 that receives blood from the blood container 10 and at least partially removes erythrocytes from the blood.

Blood is held in the interior of the blood container 10. The blood container 10 may have a structure configured to make the interior closed from outside air. The enclosed space including the interior of the blood container 10 may be configured so that there is no exchange of gasses with the outside. The blood container 10 may be embedded and enveloped in a gas impermeable substance. At least part of the blood container 10 may be formed by being engraved into a member. At least part of the blood container 10 may be formed of superimposed recesses engraved into a member. The blood container 10 may be capable of changing the volume of the blood container 10.

An erythrocyte sedimentation agent or erythrocyte removal agent for example is held inside the erythrocyte removal vessel 11. The erythrocyte removal vessel 11 may have a structure configured to make the interior closed from outside air. The enclosed space including the interior of the erythrocyte removal vessel 11 may be configured so that there is no exchange of gasses, viruses, microorganisms, impurities or the like with the outside. The erythrocyte removal vessel 11 may be embedded and enveloped in a gas impermeable substance. At least part of the erythrocyte removal vessel 11 may be formed by being engraved into a member. At least part of the erythrocyte removal vessel 11 may be formed of superimposed recesses engraved into a member. The erythrocyte removal vessel 11 may be capable of changing the volume of the erythrocyte removal vessel 11.

A flow channel 13 for transporting blood from the blood container 10 to the erythrocyte removal vessel 11 is provided between the blood container 10 and the erythrocyte removal vessel 11. The flow channel 13 may have a structure configured to make the interior closed from outside air. The enclosed space including the interior of the flow channel 13 may be configured so that there is no exchange of gasses, viruses, microorganisms, impurities or the like with the outside. The flow channel 13 may be embedded and enveloped in a gas impermeable substance. At least part of the flow channel 13 may be formed by being engraved into a member. At least part of the flow channel 13 may be formed of superimposed recesses engraved into a member.

A flow channel 12 for transporting a fluid such as air or another gas from the erythrocyte removal vessel 11 to the blood container 10 is also provided between the blood container 10 and the erythrocyte removal vessel 11. The flow channel 12 may have a structure configured to make the interior closed from outside air. The enclosed space including the interior of the flow channel 12 may be configured so that there is no exchange of gasses, viruses, microorganisms, impurities or the like with the outside. The flow channel 12 may be embedded and enveloped in a gas impermeable substance. At least part of the flow channel 12 may be formed by being engraved into a member. At least part of the flow channel 12 may be formed of superimposed recesses engraved into a member.

The blood container 10 may also be connected to the flow channels 12 and 13 by connectors. The connectors may be sterile connectors. The connectors may also be needleless connectors. The needleless connectors may be split septum type or mechanical bulb type connectors.

A fluid machinery 14 such as a pump for transporting a fluid inside the flow channel 13 may be disposed in the flow channel 13. A fluid machinery may also be provided in the flow channel 12, or fluid machineries may be provided in both the flow channel 12 and the flow channel 13. In these disclosures, both gasses and liquids are considered fluids.

A positive displacement pump may be used as the fluid machinery 14. Examples of positive displacement pumps include reciprocating pumps such as piston pumps, plunger pumps and diaphragm pumps, and rotating pumps such as gear pumps, vane pumps and screw pumps. Examples of diaphragm pumps include tubing pumps and piezo pumps. Tubing pumps are sometimes called peristaltic pumps. It is also possible to use a microfluid chip module obtained by combining various kinds of pumps. The same applies to other fluid machineries in these disclosures. Using a sealed pump such as a peristaltic pump, tubing pump or diaphragm pump, it is possible to transmit fluids without the pump directly contacting the fluid inside the flow channel.

When the erythrocyte removal vessel 11 is already filled with a gas and an erythrocyte sedimentation agent, and the fluid machinery 14 suctions the blood in the blood container 10 via the flow channel 13 and supplies the suctioned blood inside the erythrocyte removal vessel 11, the gas inside the erythrocyte removal vessel 11 is pushed by pressure and sent to the interior of the blood container 10 via the flow channel 12. The pressures inside the blood container 10 and the erythrocyte removal vessel 11 can be equilibrated by transporting the blood in the blood container 10 to the interior of the erythrocyte removal vessel 11 and the gas in the erythrocyte removal vessel 11 to the interior of the blood container 10.

The fluid machinery 14 may also suction the gas inside the erythrocyte removal vessel 11 via the flow channel 13 and supply the suctioned gas to the interior of the blood container 10. In this case, the blood inside the blood container 10 is pushed by pressure and sent to the interior of the erythrocyte removal vessel 11 via the flow channel 12. Thus, the blood inside the blood container 10 can also be sent to the erythrocyte removal vessel 11 by removing the gas from inside the erythrocyte removal vessel 11.

The blood sent to the erythrocyte removal vessel 11 contacts an erythrocyte sedimentation agent or erythrocyte removal agent in the erythrocyte removal vessel 11. The fluid machinery 14 may also agitate the blood by repeatedly suctioning the fluid in the erythrocyte removal vessel 11 and transporting the fluid to the interior of the erythrocyte removal vessel 11. When the erythrocyte removal vessel 11 contains an erythrocyte sedimentation agent, the erythrocytes are sedimented inside the erythrocyte removal vessel 11 and at least partially removed from the blood. When the erythrocyte removal vessel 11 contains an erythrocyte removal agent, the erythrocytes are hemolyzed inside the erythrocyte removal vessel 11 and at least partially removed from the blood.

The erythrocyte removal device 100 may also comprise a mononuclear cell collector 15 that receives treated blood from which erythrocytes have been at least partially removed from the erythrocyte removal vessel 11 and collects mononuclear cells from the treated blood. The mononuclear cell collector 15 may have a structure configured to make the interior closed from outside air. The enclosed space including the interior of the mononuclear cell collector 15 may be configured so that there is no exchange of gasses, viruses, microorganisms, impurities or the like with the outside. The mononuclear cell collector 15 may be embedded and enveloped in a gas impermeable substance. At least part of the mononuclear cell collector 15 may be formed by being engraved into a member. At least part of the mononuclear cell collector 15 may be formed of superimposed recesses engraved into a member. The mononuclear cell collector 15 may be capable of changing the volume of the mononuclear cell collector 15.

Figure 2:
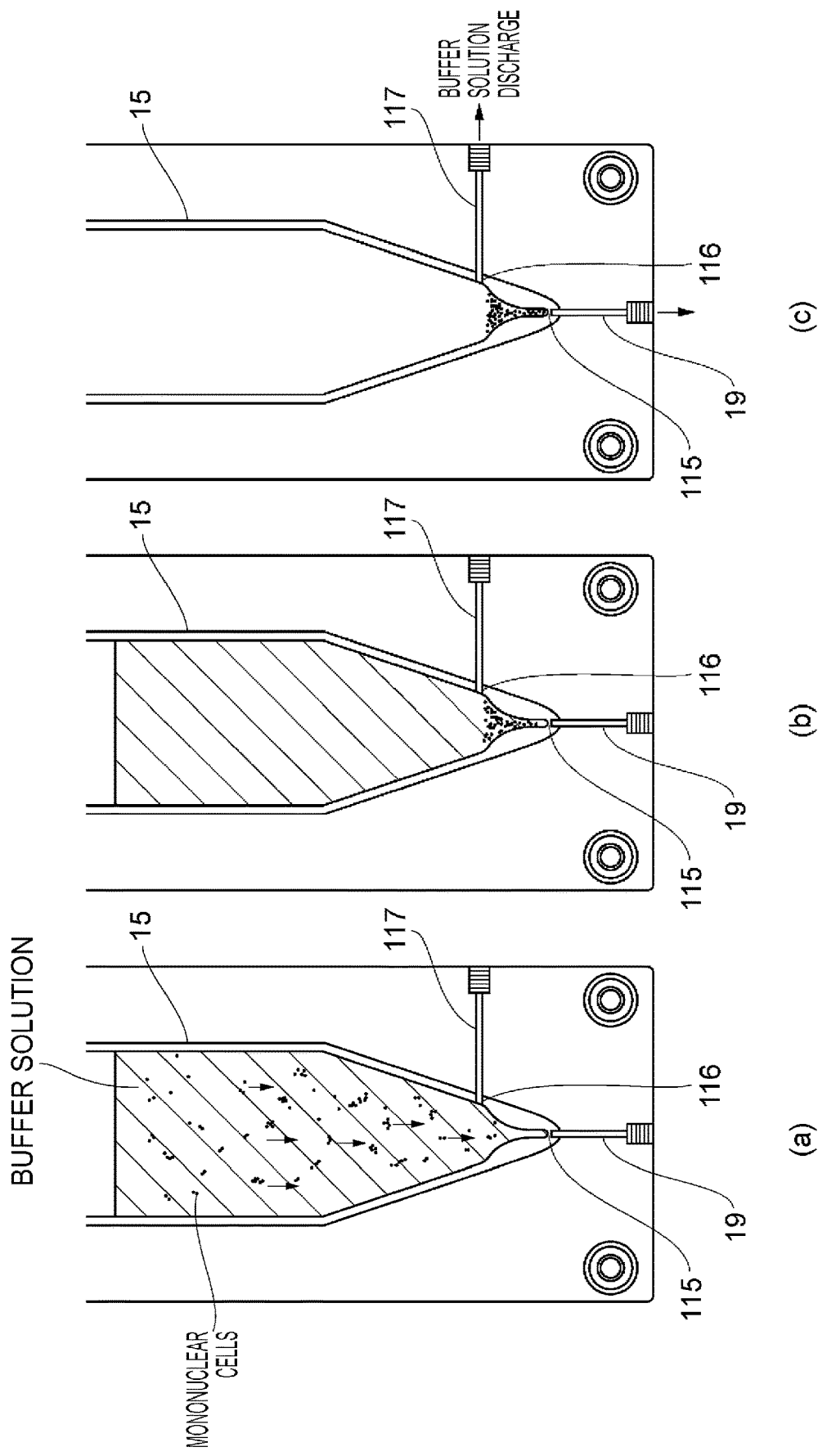
FIG. 2 is a schematic view of a mononuclear cell collector according to the first embodiment.

As shown in FIG. 2, for example a first opening 115 is provided at the bottom of the mononuclear cell collector 15, and a second opening 116 is provided on the side of the mononuclear cell collector 15. The first opening 115 is positioned below the second opening 116 in the direction of gravity.

A flow channel 19 is connected to the first opening 115 of the mononuclear cell collector 15. The flow channel 19 may have a structure configured to make the interior closed from outside air. The enclosed space including the interior of the flow channel 19 may be configured so that there is no exchange of gasses, viruses, microorganisms, impurities or the like with the outside. The flow channel 19 may be embedded and enveloped in a gas impermeable substance. At least part of the flow channel 19 may be formed by being engraved into a member. At least part of the flow channel 19 may be formed of superimposed recesses engraved into a member.

A flow channel 117 is connected to the second opening 116 of the mononuclear cell collector 15. The flow channel 117 may have a structure configured to make the interior closed from outside air. The enclosed space including the interior of the flow channel 117 may be configured so that there is no exchange of gasses, viruses, microorganisms, impurities or the like with the outside. The flow channel 117 may be embedded and enveloped in a gas impermeable substance. At least part of the flow channel 117 may be formed by being engraved into a member. At least part of the flow channel 117 may be formed of superimposed recesses engraved into a member. As shown in FIG. 1, a fluid machinery 21 such as a pump for transporting a fluid inside the flow channel 117 may be provided in the flow channel 117.

As shown in FIG. 2, the bottom of the mononuclear cell collector 15 may be funnel shaped. In this case, for example the first opening 115 is provided at the tip of the funnel-shaped bottom of the mononuclear cell collector 15, and the second opening 116 is provided on the side of the funnel-shaped bottom. The second opening 116 may also be provided with a filter that does not allow passage of mononuclear cells.

A diluting liquid such as a buffer solution may be contained in the interior of the mononuclear cell collector 15. The diluting liquid may be introduced into the mononuclear cell collector 15 via a flow channel 60 from the liquid diluent container 61 shown in FIG. 1, which holds the diluting liquid. The liquid diluent container 61 may be capable of changing the volume of the liquid diluent container. Furthermore, the interiors of the flow channel 19 and the flow channel 117 may also be filled with diluting liquid for example.

Either or both of the liquid diluent container 61 and the flow channel 60 may have a structure configured to make the interior closed from outside air. The enclosed spaces including the interiors of the liquid diluent container 61 and the flow channel 60 may be configured so that there is no exchange of gasses, viruses, microorganisms, impurities or the like with the outside. The liquid diluent container 61 and the flow channel 60 may be embedded and enveloped in a gas impermeable substance. At least part of the liquid diluent container 61 and the flow channel 60 may be formed by being engraved into a member. At least part of the liquid diluent container 61 and the flow channel 60 may be formed of superimposed recesses engraved into a member.

A flow channel 17 for transporting treated blood from which erythrocytes have been at least partially removed from the erythrocyte removal vessel 11 to the mononuclear cell collector 15 is provided between the erythrocyte removal vessel 11 and the mononuclear cell collector 15. The flow channel 17 may have a structure configured to make the interior closed from outside air. The enclosed space including the interior of the flow channel 17 may be configured so that there is no exchange of gasses, viruses, microorganisms, impurities or the like with the outside. The flow channel 17 may be embedded and enveloped in a gas impermeable substance. At least part of the flow channel 17 may be formed by being engraved into a member. At least part of the flow channel 17 may be formed of superimposed recesses engraved into a member.

A flow channel 16 for transporting a fluid such as air or another gas from the mononuclear cell collector 15 to the erythrocyte removal vessel 11 is provided between the erythrocyte removal vessel 11 and the mononuclear cell collector 15. The flow channel 16 may have a structure configured to make the interior closed from outside air. The enclosed space including the interior of the flow channel 16 may be configured so that there is no exchange of gasses, viruses, microorganisms, impurities or the like with the outside. The flow channel 16 may be embedded and enveloped in a gas impermeable substance. At least part of the flow channel 16 may be formed by being engraved into a member. At least part of the flow channel 16 may be formed of superimposed recesses engraved into a member.

A fluid machinery 18 such as a pump is provided in the flow channel 17 for transporting a fluid inside the flow channel 17. A fluid machinery may also be provided in the flow channel 16, or fluid machineries may be provided in both the flow channel 16 and the flow channel 17.

When the mononuclear cell collector 15 is already filled with a gas and a diluting liquid, and the fluid machinery 18 suctions treated blood from which erythrocytes have been at least partially removed from inside the erythrocyte removal vessel 11 via the flow channel 17 and supplies the suctioned treated blood from which erythrocytes have been at least partially removed to the interior of the mononuclear cell collector 15, the gas inside the mononuclear cell collector 15 is pushed by pressure and sent to the interior of the erythrocyte removal vessel 11 via the flow channel 16. The pressures inside the erythrocyte removal vessel 11 and the mononuclear cell collector 15 can be equilibrated by transporting the treated blood from which erythrocytes have been at least partially removed from inside the erythrocyte removal vessel 11 to the interior of the mononuclear cell collector 15 and transporting the gas inside the mononuclear cell collector 15 to the interior of the erythrocyte removal vessel 11. The diluting liquid may also be supplied repeatedly from the liquid diluent container 61.

The fluid machinery 18 may also suction the gas inside the mononuclear cell collector 15 via the flow channel 17 and supply the suctioned gas to the interior of the erythrocyte removal vessel 11. In this case, the treated blood from which erythrocytes have been at least partially removed in the erythrocyte removal vessel 11 is pushed by pressure and sent to the interior of the mononuclear cell collector 15 via the flow channel 16. Thus, the treated blood from with erythrocytes have been at least partially removed inside the erythrocyte removal vessel 11 can also be sent to the interior of the mononuclear cell collector 15 by removing the gas from inside the mononuclear cell collector 15.

When erythrocytes have been sedimented inside the erythrocyte removal vessel 11, the supernatant inside the erythrocyte removal vessel 11 is sent to the mononuclear cell collector 15 as treated blood from which erythrocytes have been at least partially removed.

Having been sent to the mononuclear cell collector 15, the treated blood from which erythrocytes have been at least partially removed is diluted with a diluting liquid as shown in FIG. 2(a). In the diluted treated blood solution, the platelets float while the mononuclear cells settle towards the bottom of the mononuclear cell collector 15. The dilution liquid may also contain an erythrocyte removal agent. In this case, erythrocytes remaining in the treated blood solution are hemolyzed.

As shown in FIG. 2(b), the settled mononuclear cells accumulate at the tip of the funnel-shaped bottom of the mononuclear cell collector 15. Once the mononuclear cells have settled in the diluted treated blood solution, as shown in FIG. 2(c), the diluted treated blood solution is suctioned as supernatant by the fluid machinery 21 shown in FIG. 1, which is provided in the flow channel 117 connected to the second opening 116 of the mononuclear cell collector 15. The suction force for suctioning the supernatant is set so that the settled mononuclear cells shown in FIG. 2(c) are unlikely to be suctioned. The supernatant contains platelets and hemolyzed erythrocytes. Consequently, the mononuclear cells can be separated from the platelets and erythrocytes by suctioning and removing the supernatant inside the mononuclear cell collector 15. The suctioned supernatant may then be sent to the erythrocyte removal vessel 11 or blood collector 10 shown in FIG. 1. Gas with an equivalent volume to the supernatant suctioned from the interior of the mononuclear cell collector 15 may also be sent to the interior of the mononuclear cell collector 15 from the erythrocyte removal vessel 11 or blood container 10.

A mononuclear cell suction device 20 for suctioning mononuclear cells that have accumulated at the bottom of the mononuclear cell collector 15 is provided in the flow channel 19. A fluid machinery such as a pump may be used as the mononuclear cell suction device 20. The size of the first opening 115 shown in FIG. 2 is set for example so that when the mononuclear cell suction device 20 is not suctioning the mononuclear cells, the mononuclear cells clog the first opening 115, while when the mononuclear cell suction device 20 is suctioning the mononuclear cells, the mononuclear cells can pass through the first opening 115. When the mononuclear cell suction device 20 suctions the mononuclear cells, the mononuclear cells move from the interior of the mononuclear cell collector 15 to the flow channel 19.

The mononuclear cells inside the mononuclear cell collector 15 may also be made to move into the flow channel 19 by applying pressure inside the mononuclear cell collector 15. In this case, a mononuclear cell suction device 20 may or may not be provided in the flow channel 19.

As shown in FIG. 1, the cell culture device 200 according to the first embodiment comprises a cell culture vessel 22 for culturing cells. The cell culture vessel 22 may have a structure configured to make the interior closed from outside air. The enclosed space including the interior of the cell culture vessel 22 may be configured so that there is no exchange of gasses, viruses, microorganisms, impurities or the like with the outside. The cell culture vessel 22 may be embedded and enveloped in a gas impermeable material. At least part of the cell culture vessel 22 may be formed by being engraved into a member. At least part of the cell culture vessel 22 may be formed of superimposed recesses engraved into a member.

Cells may be adhesion cultured or cells may be float cultured inside the cell culture vessel 22. When the cells are adhesion cultured, the interior of the cell culture vessel 22 may be coated with a coating agent for cell adhesion, such as Matrigel, collagen, polylysine, fibronectin, vitronectin or laminin. The following explanations pertain to an example of a float culture. The interior of the cell culture vessel 22 may be divided with a medium component permeable member that is impermeable to cells but permeable to medium components and waste products. To prevent cell adhesion, the inner wall of the cell culture vessel 22 may be coated with a non-cell adhesive substance such as poly-HEMA (poly 2-hydroxyethyl methacrylate) to make the inner wall of the cell culture vessel 22 non-cell adhesive. The cell culture vessel 22 may also have a window to allow observation of the interior. The window may be made of glass or resin for example.

The cell culture vessel 22 may also be provided with a temperature regulator to heat and cool the window. The temperature regulator may be a transparent heater such as transparent conductive film that is disposed on the window to heat the window. The cell culture vessel 22 may also be provided with a temperature regulator to heat and cool the housing. The temperature of the medium inside the cell culture vessel 22 can be regulated by using a temperature regulator to regulate the temperature of the housing. The cell culture vessel 22 may also be provided with a thermometer for measuring the temperature of the medium inside the cell culture vessel 22. The thermometer may measure the temperature of the medium based on the temperature of the cell culture vessel 22 without contacting the medium or may measure the temperature directly in contact with the medium. In this case, feedback control may be applied to the temperature regulator to keep the temperature of the medium at a predetermined temperature. The temperature of the medium is adjusted to from 20° C. to 45° C. for example.

The flow channel 19 is connected to the cell culture vessel 22. Cells are sent to the interior of the cell culture vessel 22 via the flow channel 19. A flow channel 23 is connected to the flow channel 19. The flow channel 23 may have a structure configured to make the interior closed from outside air. The enclosed space including the interior of the flow channel 23 may be configured so that there is no exchange of gasses, viruses, microorganisms, impurities or the like with the outside. The flow channel 23 may be embedded and enveloped in a gas impermeable material. At least part of the flow channel 23 may be formed by being engraved into a member. At least part of the flow channel 23 may be formed of superimposed recesses engraved into a member. A fluid machinery 24 such as a pump for transporting a fluid inside the flow channel 23 may be provided in the flow channel 23.

A first culture medium container 25 that is a fluid container for holding a somatic cell medium such as a differentiated cell medium for example is connected to the flow channel 23. The somatic cell medium may be a gel medium or liquid medium.

When the medium is a gel medium, the medium may contain a polymer compound. The polymer compound may be at least one selected from the group consisting of gellan gum, deacylated gellan gum, hyaluronic acid, lambzan gum, diutan gum, xanthan gum, carrageenan, fucoidan, pectin, pectic acid, pectinic acid, heparan sulfate, heparin, heparitin sulfate, keratan sulfate, chondroitin sulfate, deltaman sulfate and rhamnan sulfate, and salts of these. The medium may also contain methyl cellulose. Aggregation between cells can be well suppressed by including methyl cellulose.

The medium may also contain at least one temperature sensitive gel selected from poly(glycerol monomethacrylate) (PGMA), poly(2-hydroxypropyl methacrylate) (PHPMA), poly(N-isopropylacrylamide) (PNIPAM), amine-terminated, carboxylic acid terminated, maleimide terminated, N-hydroxysuccinimide (NHS) ester terminated and triethoxysilane terminated poly(N-isopropylacrylamide-co-acrylamide), poly(N-isopropylacrylamide-co-acrylic acid), poly(N-isopropylacrylamide-co-butyl acrylate), poly(N-isopropylacrylamide-co-methacrylic acid), poly(N-isopropylacrylamide-co-methacrylic acid-co-octadecyl acrylate) and N-isopropylacrylamide.

In these disclosures, gel-like media and gel media include polymer media.

When the cells sent from the flow channel 19 to the interior of the cell culture vessel 22 are mononuclear cells that are somatic cells, a blood cell medium for example may be used as the somatic cell medium. The first culture medium container 25 may have a structure configured to make the interior closed from outside air. The enclosed space including the interior of the first culture medium container 25 may be configured so that there is no exchange of gasses, viruses, microorganisms, impurities or the like with the outside. The first culture medium container 25 may be embedded and enveloped in a gas impermeable substance. At least part of the first culture medium container 25 may be formed by being engraved into a member. At least part of the first culture medium container 25 may be formed of superimposed recesses engraved into a member. The first culture medium container 25 may be capable of changing the volume of the first culture medium container 25. In this case, for example the first culture medium container 25 may comprise a syringe containing a somatic cell medium and a plunger that can be inserted into the syringe and can be moved inside the syringe, and the volume that can accommodate the somatic cell medium in the syringe can be changed by moving the plunger. Alternatively, the first culture medium container 25 may be a flexible bellows or bag.

When mononuclear cells are sent from the mononuclear cell collector 15 to the flow channel 19, the fluid machinery 24 sends somatic cell medium from the first culture medium container 25 to the flow channel 19 via the flow channel 23. The first culture medium container 25 reduces the volume that can accommodate the somatic cell medium. The volume of the first culture medium container 25 may be actively contracted, or the volume may contract passively due to suction force from the interior of the flow channel 23. The somatic cell medium sent to the flow channel 19 via the flow channel 23 is mixed with the mononuclear cells in the flow channel 19 and sent to the interior of the cell culture vessel 22.

The first culture medium container 25 may also be provided with a temperature regulation device for regulating the temperature of the medium inside the first culture medium container 25.

A first variable volume container 27 is connected to the cell culture vessel 22 via a flow channel 26. The flow channel 26 may have a structure configured to make the interior closed from outside air. The enclosed space including the interior of the flow channel 26 may be configured so that there is no exchange of gasses, viruses, microorganisms, impurities or the like with the outside. The flow channel 26 may be embedded and enveloped in a gas impermeable substance. At least part of the flow channel 26 may be formed by being engraved into a member. At least part of the flow channel 26 may be formed of superimposed recesses engraved into a member. A fluid machinery 28 such as a pump for transporting a fluid inside the flow channel 26 may be provided in the flow channel 26.

The first variable volume container 27 may have a structure configured to make the interior closed from outside air. The enclosed space including the interior of the first variable volume container 27 may be configured so that there is no exchange of gasses, viruses, microorganisms, impurities or the like with the outside. The first variable volume container 27 may be embedded and enveloped in a gas impermeable substance. At least part of the first variable volume container 27 may be formed by being engraved into a member. At least part of the first variable volume container 27 may be formed of superimposed recesses engraved into a member. The first variable volume container 27 may be capable of changing the volume of the first variable volume container 27. In this case, for example the first variable volume container 27 may comprise a syringe that holds a fluid and a plunger that can be inserted into the syringe and can be moved inside the syringe, and the volume that can accommodate the fluid in the syringe can be changed by moving the plunger. Alternatively, the first variable volume container 27 may be a flexible bellows or bag.

A second variable volume container 30 is connected to the cell culture vessel 22 via a flow channel 29 for example. The flow channel 29 may have a structure configured to make the interior closed from outside air. The enclosed space including the interior of the flow channel 29 may be configured so that there is no exchange of gasses, viruses, microorganisms, impurities or the like with the outside. The flow channel 29 may be embedded and enveloped in a gas impermeable substance. At least part of the flow channel 29 may be formed by being engraved into a member. At least part of the flow channel 29 may be formed of superimposed recesses engraved into a member. A fluid machinery such as a pump for transporting a fluid inside the flow channel 29 may be provided in the flow channel 29.

The second variable volume container 30 may have a structure configured to make the interior closed from outside air. The enclosed space including the interior of the second variable volume container 30 may be configured so that there is no exchange of gasses, viruses, microorganisms, impurities or the like with the outside. The second variable volume container 30 may be embedded and enveloped in a gas impermeable substance. At least part of the second variable volume container 30 may be formed by being engraved into a member. At least part of the second variable volume container 30 may be formed of superimposed recesses engraved into a member. The second variable volume container 30 may be capable of changing the volume of the second variable volume container 30. In this case, for example the second variable volume container 30 may comprise a syringe that holds a fluid and a plunger that can be inserted into the syringe and can be moved inside the syringe, and the volume that can accommodate the fluid in the syringe can be changed by moving the plunger. Alternatively, the second variable volume container 30 may be a flexible bellows or bag.

When mononuclear cells and somatic cell medium are sent from the flow channel 19 to the cell culture vessel 22, gasses such as air inside the cell culture vessel 22 move into the second variable volume container 30 for example, and the volume of the second variable volume container 30 expands to accommodate the gasses transporting from the cell culture vessel 22. The volume of the second variable volume container 30 may be expanded actively, or the volume may expand passively under pressure.

The inside of the first variable volume container 27 holds a substance such as an induction factor, which may be for example a factor that induces cells in a second state from cells in a first state. The induction factor may be RNA, or a protein, or a compound. The RNA may be modified RNA or unmodified RNA. The first variable volume container 27 may also hold a lipofection reagent for example. The induction factor may also be contained in a plasmid vector, or in a virus or virus vector such as retrovirus vector, lentivirus vector or Sendai virus vector. In these disclosures, induction means reprogramming, initialization, transformation, transdifferentiation or lineage reprogramming, differentiation induction, cell fate reprogramming or the like. Reprogramming factors include OCT3/4, SOX2, KLF4 and c-MYC for example. When introducing an induction factor such as a reprogramming factor into mononuclear cells to prepare iPS cells, the fluid machinery 28 moves somatic cell medium containing mononuclear cells in the cell culture vessel 22 via the flow channel 26 into the first variable volume container 27. The first variable volume container 27 expands its volume to accommodate the somatic cell medium containing the mononuclear cells. The volume of the first variable volume container 27 may be expanded actively, or the volume may expand passively under pressure. The volume of the second variable volume container 30 containing gasses is contracted to send the contained gasses to the cell culture vessel 22. The second variable volume container 30 may be contracted actively, or the volume may contract passively due to suction force from the interior of the cell culture vessel 22.

When mononuclear cells move from the interior of the cell culture vessel 22 to the interior of the first variable volume container 27, they come into contact with the induction factor inside the first variable volume container 27, and the induction factor is introduced into the mononuclear cells. The first variable volume container 27 may repeatedly expand and contract its volume to agitate the somatic cell medium containing the mononuclear cells and the induction factor.

After a predetermined time has passed, the somatic cell medium containing the mononuclear cells into which the induction factor has been introduced in the first variable volume container 27 are moved by the fluid machinery 28 via the flow channel 26 into the cell culture vessel 22. The first variable volume container 27 contracts its volume. The second variable volume container 30 also expands its volume to accommodate gasses from the cell culture vessel 22.

Alternatively, when introducing an induction factor such as a reprogramming factor into mononuclear cells to prepare iPS cells, the fluid machinery 28 may move the induction factor from inside the first variable volume container 27 to inside the cell culture vessel 22 via the flow channel 26. In this case, the first variable volume container 27 may contract its volume, and the second variable volume container 30 may expand its volume. When the induction factor moves from the interior of the first variable volume container 27 to the interior of the cell culture vessel 22, it comes into contact with the mononuclear cells in the cell culture vessel 22, and the induction factor is introduced into the mononuclear cells. The fluid machinery 28 may also move the induction factor from inside the first variable volume container 27 via the flow channel 26 into the cell culture vessel 22 in multiple batches. The induction factor is thus introduced into the mononuclear cells multiple times.

A second culture medium container 32 that is a fluid container for holding medium such as stem cell medium or somatic cell medium for example is connected to the cell culture vessel 22 via a flow channel 31 for example. An example in which the second culture medium container 32 holds stem cell medium is explained below. The stem cell medium may be either gel medium or liquid medium. An induction culture medium, expansion culture medium or maintenance culture medium may be used as the stem cell medium.

The flow channel 31 may have a structure configured to make the interior closed from outside air. The enclosed space including the interior of the flow channel 31 may be configured so that there is no exchange of gasses, viruses, microorganisms, impurities or the like with the outside. The flow channel 31 may be embedded and enveloped in a gas impermeable substance. At least part of the flow channel 31 may be formed by being engraved into a member. At least part of the flow channel 31 may be formed of superimposed recesses engraved into a member. A fluid machinery 33 such as a pump for transporting a fluid inside the flow channel 31 may be provided in the flow channel 31.

The second culture medium container 32 may have a structure configured to make the interior closed from outside air. The enclosed space including the interior of the second culture medium container 32 may be configured so that there is no exchange of gasses, viruses, microorganisms, impurities or the like with the outside. The second culture medium container 32 may be embedded and enveloped in a gas impermeable substance. At least part of the second culture medium container 32 may be formed by being engraved into a member. At least part of the second culture medium container 32 may be formed of superimposed recesses engraved into a member. The second culture medium container 32 may be capable of changing the volume of the second culture medium container 32. In this case, the second culture medium container 32 may comprise a syringe that holds a fluid and a plunger that can be inserted into the syringe and can be moved inside the syringe, and the volume that can accommodate the fluid in the syringe can be changed by moving the plunger. Alternatively, the second culture medium container 32 may be a flexible bellows or bag.

The second culture medium container 32 may be provided with a temperature regulation device for regulating the temperature of the medium inside the second culture medium container 32.

A third variable volume container 35 is connected to the cell culture vessel 22 via a flow channel 34 for example. The flow channel 34 may have a structure configured to make the interior closed from outside air. The enclosed space including the interior of the flow channel 34 may be configured so that there is no exchange of gasses, viruses, microorganisms, impurities or the like with the outside. The flow channel 34 may be embedded and enveloped in a gas impermeable substance. At least part of the flow channel 34 may be formed by being engraved into a member. At least part of the flow channel 34 may be formed of superimposed recesses engraved into a member.

The third variable volume container 35 may have a structure configured to make the interior closed from outside air. The enclosed space including the interior of the third variable volume container 35 may be configured so that there is no exchange of gasses, viruses, microorganisms, impurities or the like with the outside. The third variable volume container 35 may be embedded and enveloped in a gas impermeable substance. At least part of the third variable volume container 35 may be formed by being engraved into a member. At least part of the third variable volume container 35 may be formed of superimposed recesses engraved into a member. The third variable volume container 35 may be capable of changing the volume of the third variable volume container 35. In this case, for example the third variable volume container 35 may comprise a syringe that holds a fluid and a plunger that can be inserted into the syringe and can be moved inside the syringe, and the volume that can accommodate the fluid in the syringe can be changed by moving the plunger. Alternatively, the third variable volume container 35 may be a flexible bellows or bag.

After a predetermined time has passed since introduction of the induction factor into the mononuclear cells, the fluid machinery 33 moves the somatic cell medium inside the second culture medium container 32 into the cell culture vessel 22 via the flow channel 31. Of the sections separated by the medium component permeable member inside the cell culture vessel 22, the somatic cell medium may contact the sections where cells are present and may not enter the sections where cells are not present. The volume of the second culture medium container 32 is contracted once the somatic cell medium has been suctioned from the interior. The volume of the second culture medium container 32 may be actively contracted, or the volume may contract passively. The third variable volume container 35 expands its volume, and fluid that has become excess in the cell culture vessel 22 due to the inflow of the stem cell medium is received by the third variable volume container 35 via the flow channel 34. Of the sections separated by the medium component permeable member in the cell culture vessel 22, the flow channel 34 may contact the sections where cells are present and may also be connected to the sections where cells are not present. The volume of the third variable volume container 35 may be expanded actively, or the volume may be expanded passively under pressure.

Alternatively, of the sections separated by the medium component permeable member in the cell culture vessel 22, the flow channel 34 may contact the sections where cells are present. In this case, the excess cells in the cell culture vessel 22 may be sent to the third variable volume container 35 via the flow channel 34.

Of the sections separated by the medium component permeable member in the cell culture vessel 22, medium components and waste products are exchanged by osmotic pressure for example between medium in sections where cells are present and medium in sections where cells are absent. A semipermeable membrane, mesh or hollow fiber membrane for example may be used as the medium component permeable member. The semipermeable membrane may be a dialysis membrane.

When the culture component permeable member is a semipermeable membrane, the molecular weight fraction of the semipermeable membrane is at least 0.1 KDa, or at least 10 KDa, or at least 50 KDa for example. The semipermeable membrane is made for example from a cellulose ester, ethyl cellulose, cellulose esters, regenerated cellulose, polysulfone, polyacrylic nitrile, polymethyl methacrylate, ethylene vinyl alcohol copolymer, polyester polymer alloy, polycarbonate, polyamide, cellulose acetate, cellulose diacetate, cellulose triacetate, copper ammonium rayon, saponified cellulose, hemophan membrane, phosphatidyl choline membrane, vitamin E coated membrane or the like.

When the culture component permeable member is a mesh, the mesh has holes smaller than the cells cultured in the cell culture vessel 22. The mesh material is a resin or metal for example, without any particular limitations. The surface of the culture component permeable member may also be cell non-adhesive.

When the culture component permeable member is a hollow fiber membrane, the hollow fiber membrane has holes smaller than the cells cultured in the cell culture vessel 22. For example, the cells may be cultured inside the hollow fiber membrane.

While the cells are being cultured in the cell culture vessel 22, the fluid machinery 33 may move the stem cell medium inside the second culture medium container 32 to the interior of the cell culture vessel 22 via the flow channel 31 with a predetermined timing. The volume of the third variable volume container 35 may also be expanded to receive used stem cell medium that is now excess in the cell culture vessel 22 due to the inflow of new stem cell medium. The fluid machinery 33 may also control the amount of medium supplied and the beginning and end of the medium supply based on the condition of the medium, the condition of the cell masses in the medium, the number of cells, the number of cell masses, the turbidity of the medium, and changes in pH for example.

Of the sections separated by the medium component permeable member in the cell culture vessel 22, a fluid machinery 37 such as a pump may be connected via a flow channel 36 to the sections without cells. The flow channel 36 may have a structure configured to make the interior closed from outside air. The enclosed space including the interior of the flow channel 36 may be configured so that there is no exchange of gasses, viruses, microorganisms, impurities or the like with the outside. The flow channel 36 may be embedded and enveloped in a gas impermeable substance. At least part of the flow channel 36 may be formed by being engraved into a member. At least part of the flow channel 36 may be formed of superimposed recesses engraved into a member.

For example, the fluid machinery 37 circulates medium between the flow channel 36 and the sections where cells are present out of the sections separated by the medium component permeation membrane in the cell culture vessel 22 in order to control cell aggregation. The fluid machinery 37 may circulate the medium constantly or may circulate the medium with any timing. The fluid machinery 37 may also agitate the medium by transporting the medium back and forth between the flow channel 36 and the sections where cells are present out of the sections separated the medium component permeation membrane in the cell culture vessel 22. The fluid machinery 37 may agitate the medium constantly, or with any timing. The fluid machinery 37 may also control the amount of medium supplied and the beginning and end the medium supply based on the condition of the medium, the condition of the cell masses in the medium, the number of cells, the number of cell masses, the turbidity of the medium, and changes in pH for example.

The cells may also be passaged and expansion-cultured by suctioning the cells in the cell culture vessel 22 into the flow channel 36 and returning cells to the cell culture vessel 22. The flow channel 36 may have a structure that divides the cell masses. For example, cell masses flowing through the flow channel 36 can be divided by giving the flow channel 36 a meandering structure or a structure that increases and decreases in diameter.

Of the sections separated by the medium component permeable member in the cell culture vessel 22, a fluid machinery 39 such as a pump may be connected via a flow channel 38 to the sections in which there are no cells. The flow channel 38 may have a structure configured to make the interior closed from outside air. The enclosed space including the interior of the flow channel 38 may be configured so that there is no exchange of gasses, viruses, microorganisms, impurities or the like with the outside. The flow channel 38 may be embedded and enveloped in a gas impermeable substance. At least part of the flow channel 38 may be formed by being engraved into a member. At least part of the flow channel 38 may be formed of superimposed recesses engraved into a member.

For example the fluid machinery 39 circulates medium between the flow channel 38 and the sections where cells are not present in the sections separated by the medium component permeable member the cell culture vessel 22 in order to increase chances for contact between the medium and the medium component permeable member. The fluid machinery 39 may circulate the medium constantly, or with any timing. The fluid machinery 39 may also agitate the medium by transporting the medium back and forth between the flow channel 38 and the sections where cells are not present in the sections separated by the medium component permeable member in the cell culture vessel 22. The fluid machinery 39 may agitate the medium constantly, or with any timing. The fluid machinery 39 may also control the amount of medium supplied and the beginning and end the medium supply based on the condition of the medium, the condition of the cell masses in the medium, the number of cells, the number of cell masses, the turbidity of the medium, and changes in pH for example.

For example, once iPS cells have been prepared and expansion-cultured from mononuclear cells into which an induction factor has been introduced in the cell culture vessel 22, the iPS cells are collected from inside the cell culture vessel 22. The iPS cells may also form cell masses (colonies) in the cell culture vessel 22.

The inventors' findings have shown that because the cells can be cultured in a completely closed sealed space, it is not necessary to actively supply carbon dioxide gas, nitrogen gas, oxygen gas and the like to the interior of the cell culture vessel 22. Consequently, the cell culture vessel 22 does not need to be set in a $CO_2$ incubator. Moreover, because cells, microorganisms, viruses, dust, and the like from outside the cell culture vessel 22 do not penetrate the interior of the sealed cell culture vessel 22, the cleanliness inside the cell culture vessel 22 is maintained. Thus, the cell culture vessel 22 does not need to be kept in a clean room. However, supplying carbon dioxide gas, nitrogen gas, oxygen gas and the like to cells in a closed system is not necessarily precluded.

With the cell culture device 200 according to the embodiment, for example the risk of cross-contamination due to leakage of cells from the culture device can be reduced because the cells are cultured in a completely closed system. Moreover, even if the cells are infected with an HIV or hepatitis virus or the like for example, the risk of infection to the operator due to cell leakage can be reduced. It is also possible to reduce the risk that the medium in the cell culture vessel will be contaminated by bacteria, viruses, molds and the like from the air outside the cell culture vessel. Furthermore, with the cell culture vessel according to the embodiment, cells can be cultured without using a $CO_2$ incubator.

Second Embodiment

Figure 3:
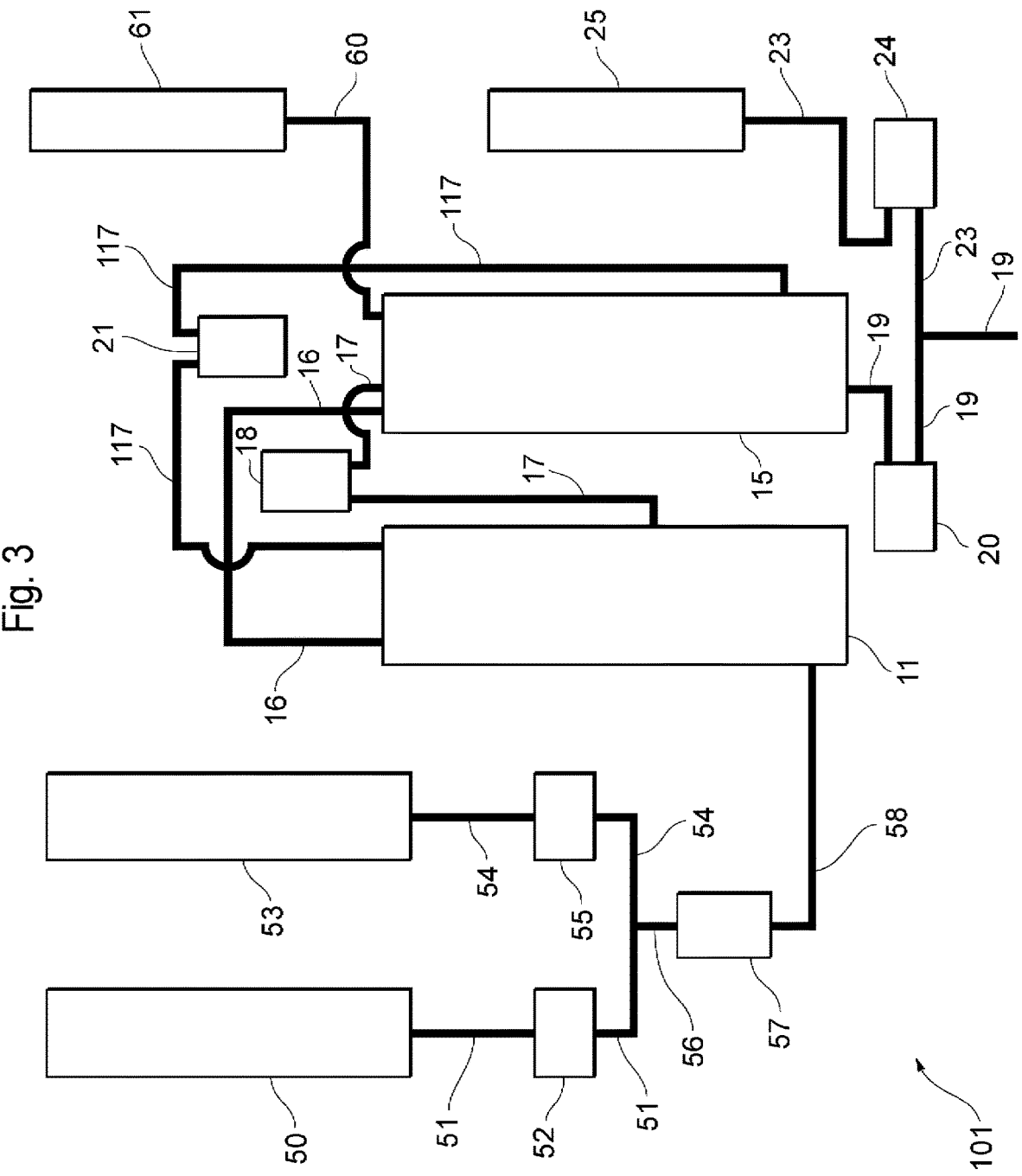
FIG. 3 is a schematic view of an erythrocyte removal device according to a second embodiment.

As shown in FIG. 3, the erythrocyte removal device 101 according to the second embodiment comprises a blood container 50 for holding blood and an erythrocyte treatment agent container 53 for holding an erythrocyte sedimentation agent or erythrocyte removal agent.

The blood container 50 holds blood on the inside. The blood container 50 may have a structure configured to make the interior closed from outside air. The enclosed space including the interior of the blood container 50 may be configured so that there is no exchange of no exchange of gasses, viruses, microorganisms, impurities or the like with the outside. The blood container 50 may be embedded and enveloped in a gas impermeable substance. At least part of the blood container 50 may be formed by being engraved into a member. At least part of the blood container 50 may be formed of superimposed recesses engraved into a member. The blood container 50 may be capable of changing the volume of the blood container 50. In this case, for example the blood container 50 may comprise a syringe that holds a fluid and a plunger that can be inserted into the syringe and can be moved inside the syringe, and the volume that can accommodate the fluid in the syringe can be changed by moving the plunger. Alternatively, the blood container 50 may be a flexible bellows or bag.

The erythrocyte treatment agent container 53 contains an erythrocyte sedimentation agent or erythrocyte removal agent. The erythrocyte treatment agent container 53 may have a structure configured to make the interior closed from outside air. The enclosed space including the interior of the erythrocyte treatment agent container 53 may be configured so that there is no exchange of gasses, viruses, microorganisms, impurities or the like with the outside. The erythrocyte treatment agent container 53 may be embedded and enveloped in a gas impermeable substance. At least part of the erythrocyte treatment agent container 53 may be formed by being engraved into a member. At least part of the erythrocyte treatment agent container 53 may be formed of superimposed recesses engraved into a member. The erythrocyte treatment agent container 53 may be capable of changing the volume of the erythrocyte treatment agent container 53. In this case, the erythrocyte treatment agent container 53 may comprise a syringe that holds a fluid and a plunger that can be inserted into the syringe and can be moved inside the syringe, and the volume that can accommodate the fluid in the syringe can be changed by moving the plunger. Alternatively, the erythrocyte treatment agent container 53 may be a flexible bellows or bag.

The erythrocyte removal device 101 according to the second embodiment may further comprise a mixer 57 for mixing blood with an erythrocyte sedimentation agent or erythrocyte removal agent for example. The mixer 57 comprises a bent flow channel through which flows a mixture of blood and an erythrocyte sedimentation agent or erythrocyte removal agent. The flow channel may also be bent in a spiral shape. The flow path may also meander in the bent flow channel. The cross-sectional area may also increase and decrease repeatedly in the bent flow channel. The mixer 57 may have a structure configured to make the interior closed from outside air. The enclosed space including the interior of the mixer 57 may be configured so that there is no exchange of gasses, viruses, microorganisms, impurities or the like with the outside. The mixer 57 may be embedded and enveloped in a gas impermeable substance. At least part of the mixer 57 may be formed by being engraved into a member. At least part of the mixer 57 may be formed of superimposed recesses engraved into a member.

A flow channel 51 for transporting at least blood from the blood container 50 to the mixer 57 is connected to the blood container 50. A flow channel 54 for transporting at least an erythrocyte sedimentation agent or erythrocyte removal agent from the erythrocyte treatment agent container 53 to the mixer 57 is connected to the erythrocyte treatment agent container 53. The flow channel 51 and flow channel 54 merge into a flow channel 56, which is connected to the mixer 57. A flow channel 58 for transporting a mixture of blood and an erythrocyte sedimentation agent or erythrocyte removal agent mixed inside the mixer 57 to the interior of the erythrocyte removal vessel 11 is connected to the mixer 57.

The flow channel 51 is provided with a fluid machinery 52 such as a pump for transporting a fluid inside the flow channel 51. The flow channel 54 is provided with a fluid machinery 55 such as a pump for transporting a fluid inside the flow channel 54.

The flow channels 51, 54, 56 and 58 may have structures that allow the interiors to be closed off from outside air. The enclosed spaces including the interiors of the flow channels 51, 54, 56 and 58 may be configured so that there is no exchange of gasses, viruses, microorganisms, impurities or the like with the outside. The flow channels 51, 54, 56 and 58 may be embedded and enveloped in a gas impermeable substance. At least a part of each of the flow channels 51, 54, 56 and 58 may be formed by being engraved into a member. At least a part of each of the flow channels 51, 54, 56 and 58 may be formed of superimposed recesses engraved into a member.

When a mixture of blood and an erythrocyte sedimentation agent or erythrocyte removal agent is to be sent to the erythrocyte removal vessel 11, the fluid machinery 52 moves blood from inside the blood container 50 to the interior of the mixer 57 via the flow channels 51 to 56. A fluid machinery 55 also moves an erythrocyte sedimentation agent or erythrocyte removal agent from inside the erythrocyte treatment agent container 53 to the inside of the mixer 57 via the flow channels 54 and 56. However, it may also be that the flow channels 51 and 54 lack fluid machineries while the flow channel 56 has a fluid machinery, in which case the fluid machinery in the flow channel 56 moves the blood inside the blood container 50 and the erythrocyte sedimentation agent or erythrocyte removal agent inside the erythrocyte treatment agent container 53 to the interior of the mixer 57. The blood is mixed with the erythrocyte sedimentation agent or erythrocyte removal agent in the mixer 57. The mixture of the blood and the erythrocyte sedimentation agent or erythrocyte removal agent mixed in the mixer 57 is sent to the erythrocyte removal vessel 11 via the flow channel 58. In the erythrocyte removal vessel 11, the erythrocytes are either sedimented or hemolyzed as in the first embodiment. Other constituent elements of the erythrocyte removal device 101 according to the second embodiment may be the same as in the erythrocyte removal device 100 according to the second embodiment.

Third Embodiment

Figure 4:
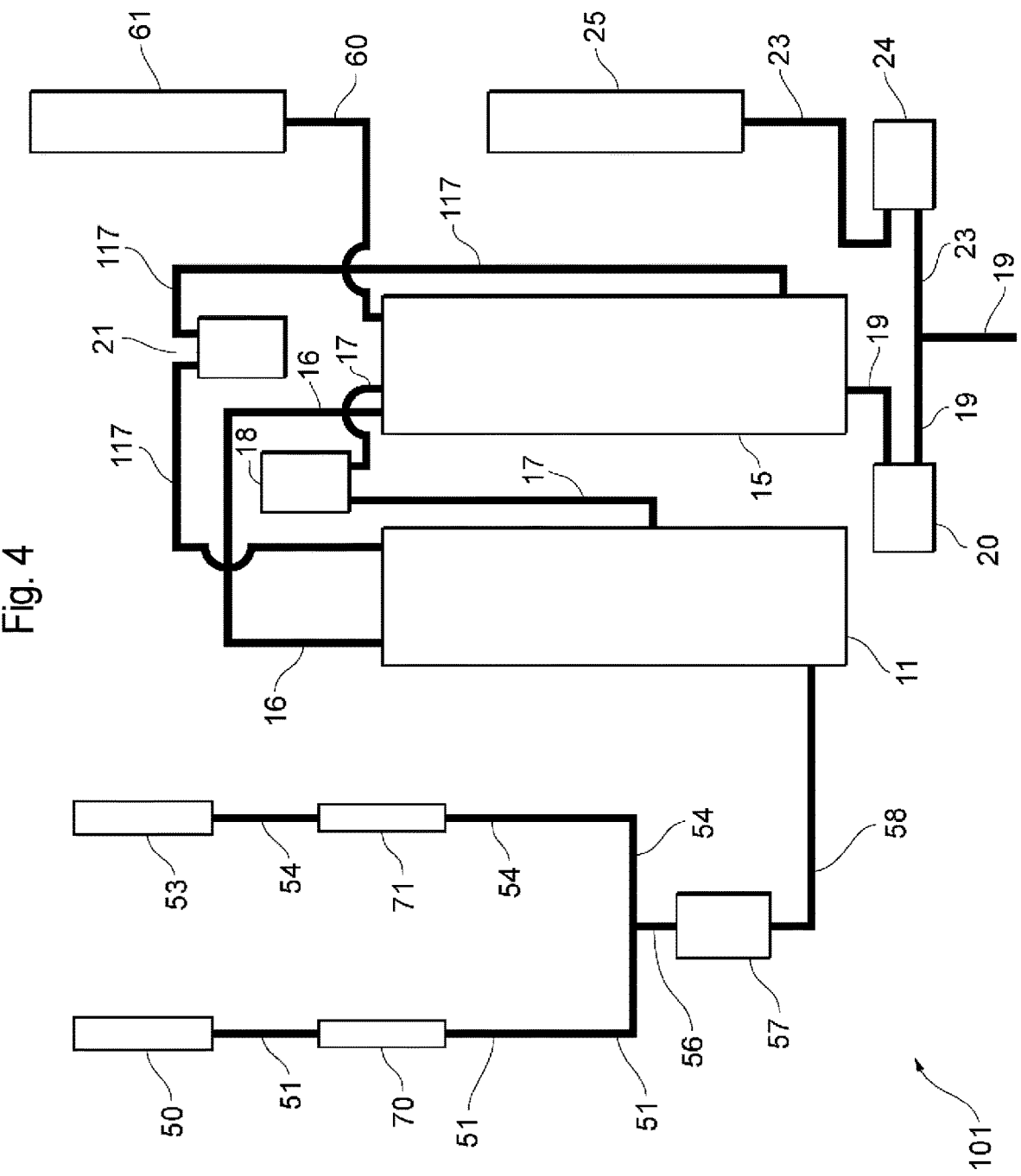
FIG. 4 is a schematic view of an erythrocyte removal device according to a third embodiment.

As shown in FIG. 4, the erythrocyte removal device 101 according to the third embodiment comprises a vacuum container 70 the interior of which can be made into a vacuum, disposed in the flow channel 51 for transporting at least blood from the blood container 50 to the mixer 57.

The vacuum container 70 may have a structure configured to make the interior closed from outside air. The enclosed space including the interior of the vacuum container 70 may be configured so that there is no exchange of no exchange of gasses, viruses, microorganisms, impurities or the like with the outside. The vacuum container 70 may be embedded and enveloped in a gas impermeable substance. At least part of the vacuum container 70 may be formed by being engraved into a member. At least part of the vacuum container 70 may be formed of superimposed recesses engraved into a member. The vacuum container 70 may be capable of changing the volume of the vacuum container 70. The vacuum container 70 may also be a flexible bellows or bag.

The erythrocyte removal device 101 according to the third embodiment comprises a vacuum container 71 the interior of which can be made into a vacuum, disposed in the flow channel 54 for transporting at least an erythrocyte sedimentation agent or erythrocyte removal agent from the erythrocyte treatment agent container 53 to the mixer 57.

The vacuum container 71 may have a structure configured to make the interior closed from outside air. The enclosed space including the interior of the vacuum container 71 may be configured so that there is no exchange of no exchange of gasses, viruses, microorganisms, impurities or the like with the outside. The vacuum container 71 may be embedded and enveloped in a gas impermeable substance. At least part of the vacuum container 71 may be formed by being engraved into a member. At least part of the vacuum container 71 may be formed of superimposed recesses engraved into a member. The vacuum container 71 may be capable of changing the volume of the vacuum container 71. The vacuum container 71 may also be a flexible bellows or bag.

When the blood container 50 is connected to the flow channel 51 with the vacuum container 70 already in a vacuum state, the blood in the blood container 50 moves to the inside of the vacuum container 70, and the blood then further moves into the mixer 57 via the flow channels 51 and 56. When the erythrocyte treatment agent container 53 is connected to the flow channel 54 with the vacuum container 71 already in a vacuum state, the erythrocyte sedimentation agent or erythrocyte removal agent inside the erythrocyte treatment agent container 53 moves to the inside of the vacuum container 71, and the blood then further moves into the mixer 57 via the flow channels 54 and 56.

The other constituent elements of the erythrocyte removal device 101 according to the third embodiment may be similar to those in the second embodiment.

Fourth Embodiment

The vacuum containers 70 and 71 shown in FIG. 4 may be omitted, and the erythrocyte removal vessel 11 may be evacuated in advance. If the blood container 50 is connected to the flow channel 51 and the erythrocyte treatment agent container 53 is connected to the flow channel 54 with the erythrocyte removal vessel 11 already in a vacuum state, the blood in the blood container 50 moves into the mixer 57 via the flow channels 51 and 56, and the erythrocyte sedimentation agent or erythrocyte removal agent in the erythrocyte treatment agent container 53 moves into the mixer 57 via the flow channels 54 and 56. The blood mixed with the erythrocyte sedimentation agent or erythrocyte removal agent in the mixer 57 then moves into the erythrocyte removal vessel 11 via the flow channel 58.

Alternatively, when the flow channel 51 and flow channel 54 are closed with valves or the like, the inside of the erythrocyte removal vessel 11 is evacuated, and the valves of the flow channels 51 and 54 are then opened, the blood inside the blood container 50 moves into the mixer 57 via the flow channels 51 and 56, and the erythrocyte sedimentation agent or erythrocyte removal agent in the erythrocyte treatment agent container 53 moves into the mixer 57 via the flow channels 54 and 56. The blood mixed with the erythrocyte sedimentation agent or erythrocyte removal agent in the mixer 57 then moves into the erythrocyte removal vessel 11 via the flow channel 58.

OTHER EMBODIMENTS

The present invention was described above using embodiments, but descriptions and drawings that form part of these disclosures should not be understood as limiting the present invention. Various alternative embodiments, other embodiments and operational techniques should be obvious to a person skilled in the art from these disclosures. For example, the cells sent to the cell culture vessel 22 shown in FIG. 1 need not be mononuclear cells. The cells sent to the cell culture vessel 22 may be stem cells, fibroblasts, or other somatic cells. Any cells may be sent to the cell culture vessel 22.

Furthermore, although an example of iPS cells prepared from mononuclear cells in the cell culture vessel 22 was explained in the first embodiment, differentiated cells such as nerve cells may also be prepared from stem cells in the cell culture vessel 22. The stem cells may be iPS cells, embryonic stem (ES) cells, somatic stem cells or other artificially induced stem cells or the like. In this case, for example the first variable volume container 27 contains a differentiation induction factor. It should thus be understood that the present invention encompasses a variety of embodiments.

EXAMPLES

Example 1

The present example shows an example of how cells can be cultured in a completely closed environment without any medium exchange or gas exchange. A growth factor was added to medium (StemSpan™ H3000, STEMCELL Technologies Inc.), and deacylated gellan gum was further added to the medium to prepare a gel medium.

The prepared gel medium was introduced into a 15 ml tube, and $2 \times 10^5$ blood cells were seeded in the gel medium. The 15 ml tube was then set in a $CO_2$ incubator, and the blood cells (mononuclear cells) were cultured for 7 days. A Sendai virus vector carrying OCT3/4, SOX2, KLF4 and cMYC was then added to the gel medium to a multiplicity of infection (MOI) of 10.0 to infect the blood cells with the Sendai virus.

After the Sendai virus was added to the gel medium, 15 ml of a gelled stem cell medium (DMEM/F12 containing 20% KnockOut™ SR (ThermoFisher SCIENTIFIC)) was added, 15 ml of the medium that contained cells that had been infected with the Sendai virus was introduced into a sealable cell culture vessel, and gel medium was injected into the cell culture vessel. The interior of the cell culture vessel was then sealed so that there was absolutely no gas exchange between the inside and outside of the cell culture vessel.

Float culture of the cells having the introduced initialization factor was initiated in the cell culture vessel. Subsequently, 2 ml of the gel medium in the culture medium holding tank 40 was replaced every 2 days with 2 ml of new gel medium.

Figure 5:
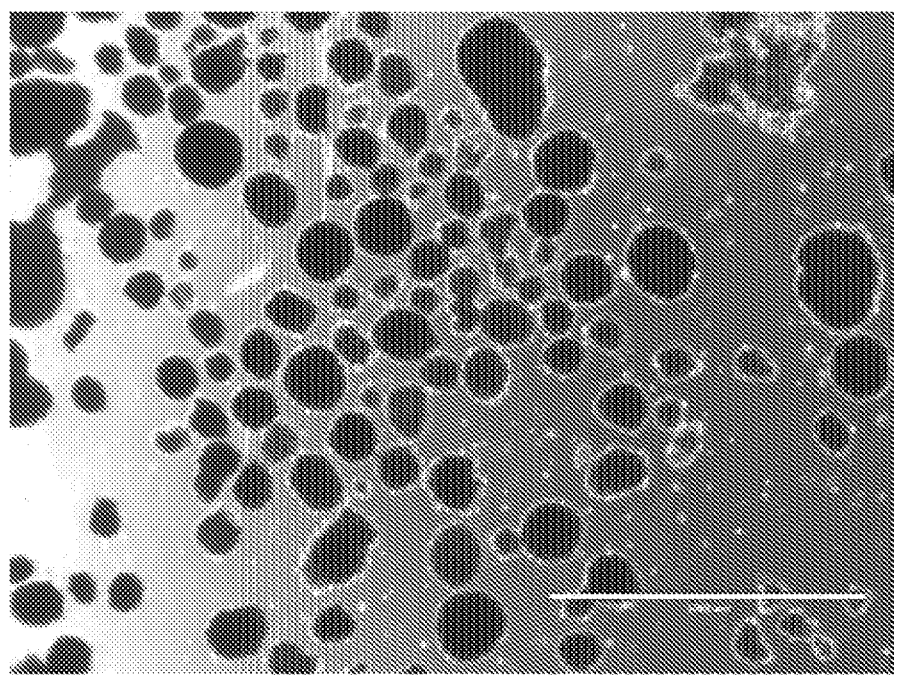
FIG. 5 is a microscopic image of a cell mass in Example 1.
Figure 6:
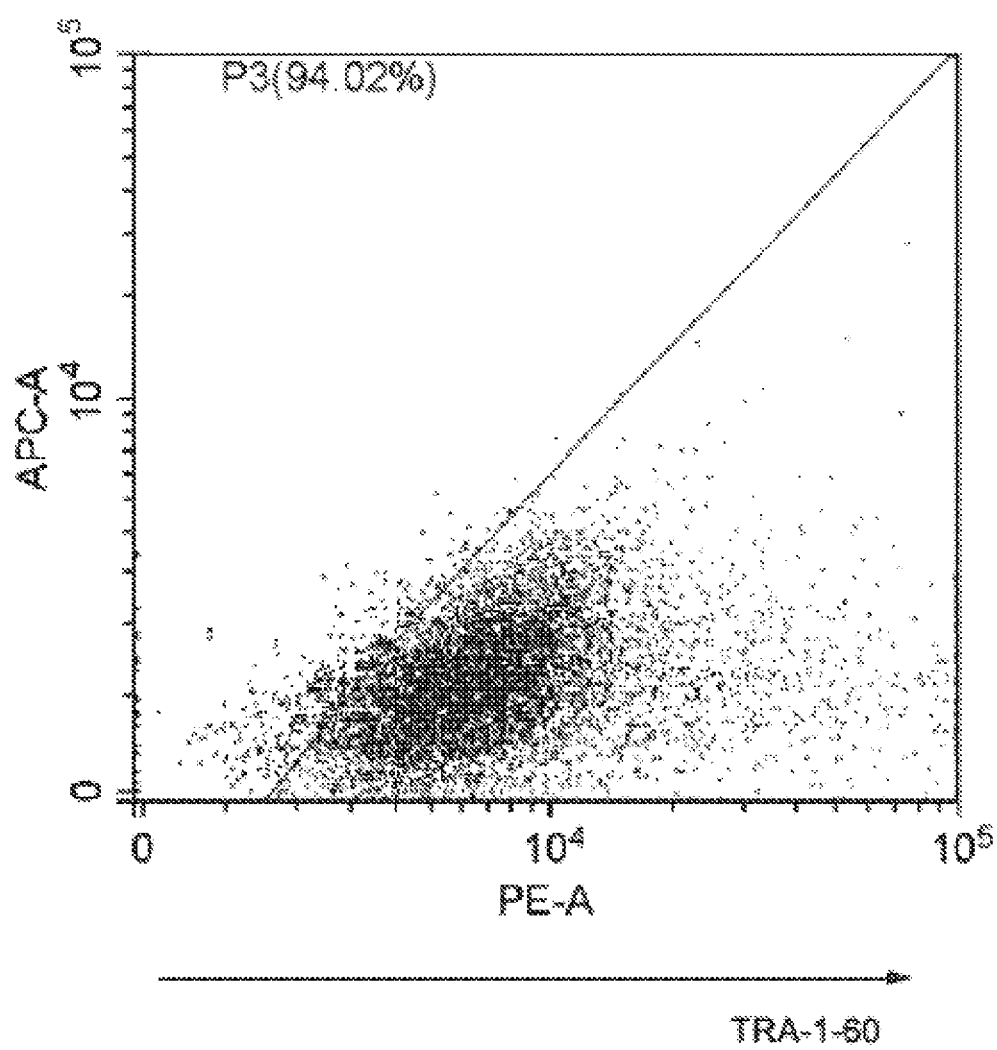
FIG. 6 is a histogram showing results from flow cytometry of iPS cells in Example 1.

When the cells were observed under a microscope after 15 days, formation of ES cell-like colonies was confirmed as shown in FIG. 5. Cells were also fixed with 4% paraformaldehyde, and when the expressed amount of the cell surface antigen TRA-1-60 in the fixed cells was observed by flow cytometry, the TRA-1-60 positive rate was at least 90% as shown in FIG. 6, confirming almost complete reprogramming. This shows that iPS cells can be induced from somatic cells other than stem cells without any medium exchange or gas exchange in a completely closed environment.

Example 2

Figure 7:
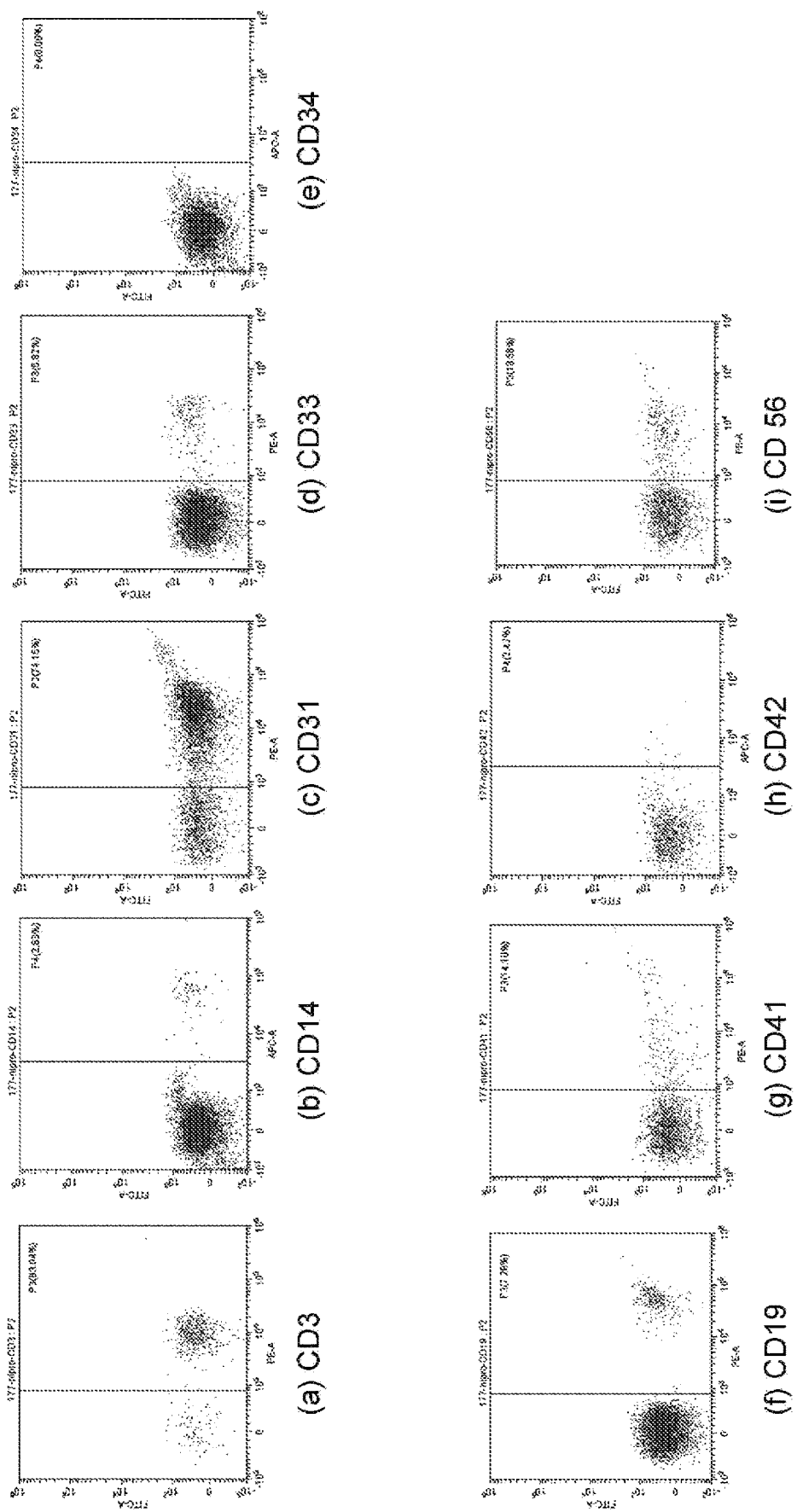
FIG. 7 shows analysis results from fluorescence-activated cell sorting in Example 2.

Blood was treated with an erythrocyte sedimentation agent to obtain treated blood from which the erythrocytes had been at least partially removed. The treated blood was treated with surface cell marker antibodies and analyzed by fluorescence-activated cell sorting (FACS) with the results shown in FIG. 7. The treated blood contained CD3-positive cells, CD14-positive cells, CD31-positive cells, CD33-positive cells, CD34-positive cells, CD19-positive cells, CD41-positive cells, CD42-positive cells, and CD56-positive cells.

Figure 8:
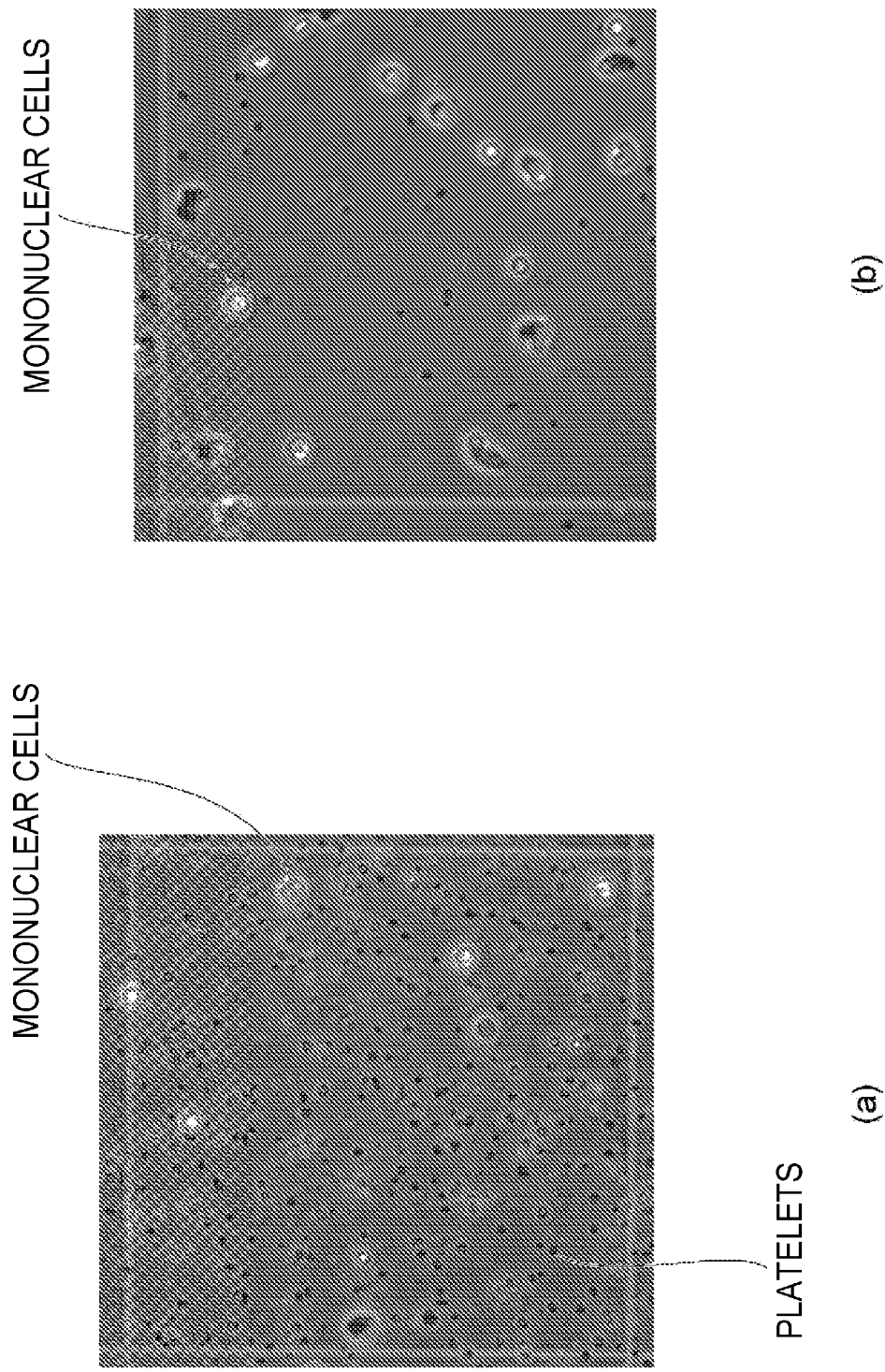
FIG. 8 shows a microscopic image (a) of treated blood before it was introduced into the mononuclear cell collector of Example 2, and a microscopic image (b) of a solution containing mononuclear cells collected from the mononuclear cell collector.
Figure 9:
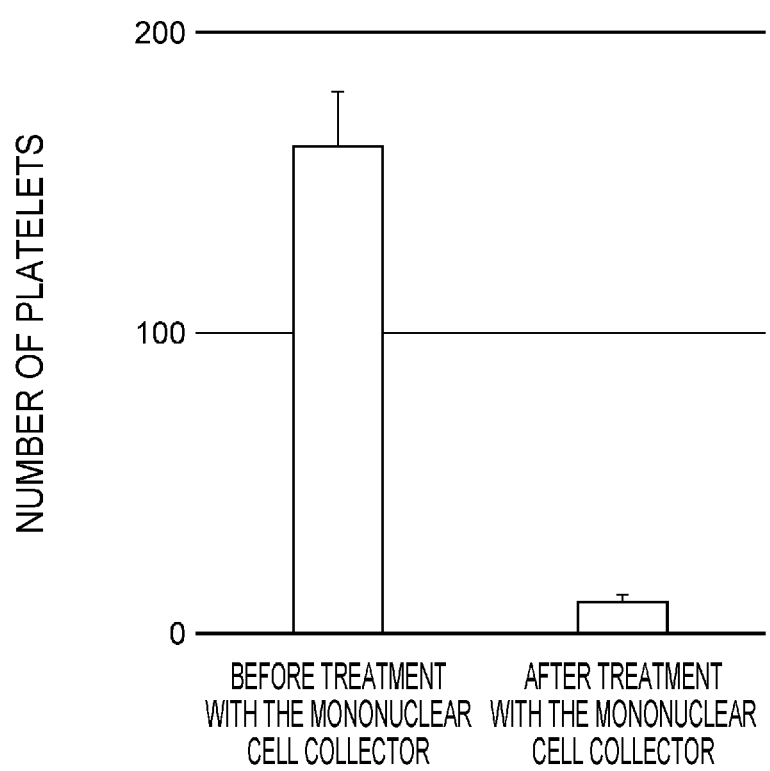
FIG. 9 is a graph showing the number of platelets in treated blood before being introduced into the mononuclear cell collector of Example 2 and the number of platelets in a solution containing mononuclear cells collected from the mononuclear cell collector.

The treated blood from which the erythrocytes had been at least partially removed was introduced into a mononuclear cell collector such as that shown in FIG. 2 and diluted with buffer solution, and the supernatant was removed. Mononuclear cells were then collected from the mononuclear cell collector. As shown in FIG. 8(a), before being introduced into the mononuclear cell collector the treated blood contained numerous platelets. However, as shown in FIG. 8(b), the platelets had been largely removed from the mononuclear cell-containing solution that was collected from the mononuclear cell collector. FIG. 9 is a graph showing the number of platelets in treated blood before it was introduced into the mononuclear cell collector and the number of platelets in the mononuclear cell-containing solution that was collected from the mononuclear cell collector per the same area.

Figure 10:
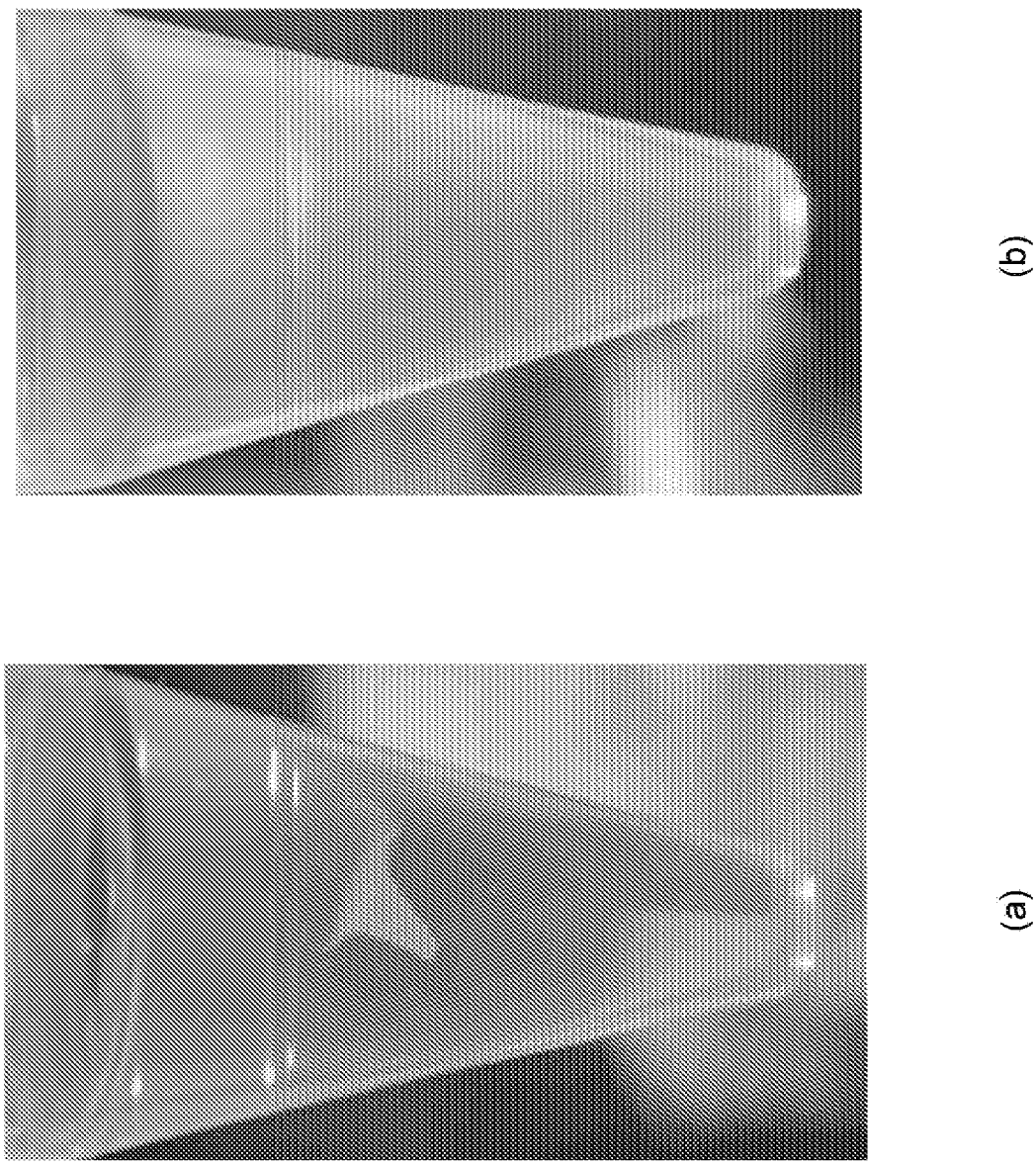
FIG. 10 shows a photograph (a) of a culture solution to which platelet-containing treated blood has been added before being introduced into the mononuclear cell collector of Example 2, and a photograph (b) of a culture solution to which the mononuclear cell-containing solution from which the platelets have been removed was added.

When the treated blood containing platelets was added to a culture solution before being introduced into the mononuclear cell collector, it aggregated as shown in FIG. 10(a). On the other hand, when the mononuclear cell-containing solution from which the platelets had been removed was collected from the mononuclear cell collector and added to a culture solution, it did not aggregate as shown in FIG. 10(b).

Example 3

Deacylated gellan gum was added to blood medium to prepare a gel medium. The prepared gel medium was introduced into a laminin-coated 6-well dish and seeded with $2 \times 10^5$ blood cells (mononuclear cells). The 6-well dish was then placed in a 37° C. $CO_2$ incubator, and the blood cells were cultured for 7 days. A Sendai virus vector (CytoTune-iPS 2.0, ThermoFisher SCIENTIFIC) carrying OCT3/4, SOX2, KLF4 and cMYC was then added to the blood growth medium to a multiplicity of infection (MOI) of 5 to infect the blood cells with the Sendai virus.

Two days after addition of the Sendai virus to the blood growth medium, medium substitution was performed using 500 μl of stem cell medium (DMEM/F12 containing 20% KnockOut™ SR (Thermo Fisher SCIENTIFIC)) or StemFit with the cells still in the 6-well dish.

Figure 11:
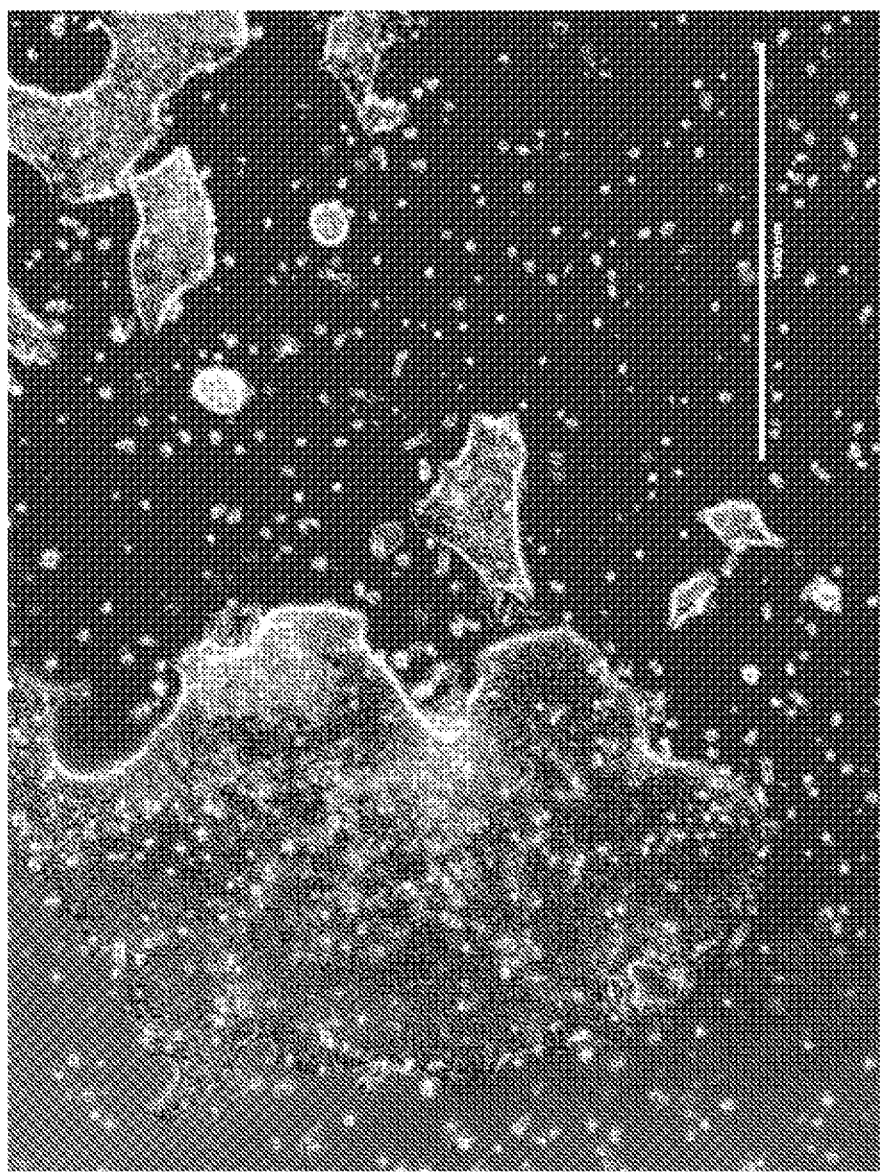
FIG. 11 is a microscopic image of cells prepared by the iPS cell preparation method of Example 3.
Figure 12:
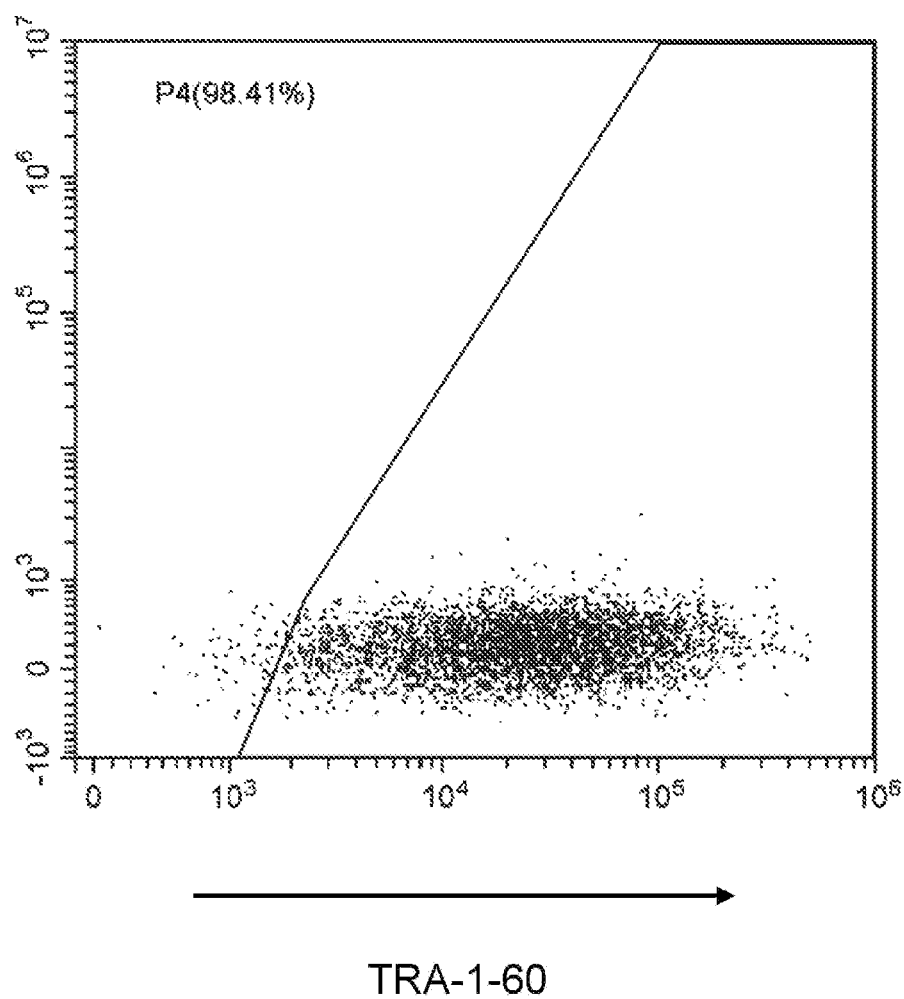
FIG. 12 is a histogram showing the results of flow cytometry analysis of cells prepared by the iPS cell preparation method of Example 3.

When the cells were observed under a microscope 15 days after addition of the Sendai virus to the blood growth medium, formation of ES cell-like colonies was confirmed as shown in FIG. 11. Cells were also fixed with 4% paraformaldehyde, and when the expressed amount of the cell surface antigen TRA-1-60 in the fixed cells was observed by flow cytometry, about 100% of the cells after induction were TRA-1-60 positive as shown in FIG. 12, confirming almost complete reprogramming. This shows that cells can be reprogrammed by introducing a reprogramming factor into cells in a cell culture vessel and culturing the cells with the introduced reprogramming factor in the same cell culture vessel.

Example 4

Deacylated gellan gum was added to blood medium to prepare a gel medium. The prepared gel medium was introduced into a laminin-coated flask and seeded with $5 \times 10^5$ blood cells (mononuclear cells). This was then placed in a 37° C. $CO_2$ incubator, and the blood cells were cultured for 7 days. A Sendai virus vector (CytoTune-iPS 2.0, ThermoFisher SCIENTIFIC) carrying OCT3/4, SOX2, KLF4 and cMYC was then added to the blood growth medium to a multiplicity of infection (MOI) of 5 to infect the blood cells with the Sendai virus.

Two days after addition of the Sendai virus to the blood growth medium, the flask was completely filled with stem cell medium (DMEM/F12 containing 20% KnockOut™ SR (ThermoFisher SCIENTIFIC)) or StemFit so that no air remained in the flask, and the flask cap was tightened to prevent gas exchange with the outside and close off the interior of the flask so that no cells, microorganisms, impurities, or the like could penetrate.

Figure 13:
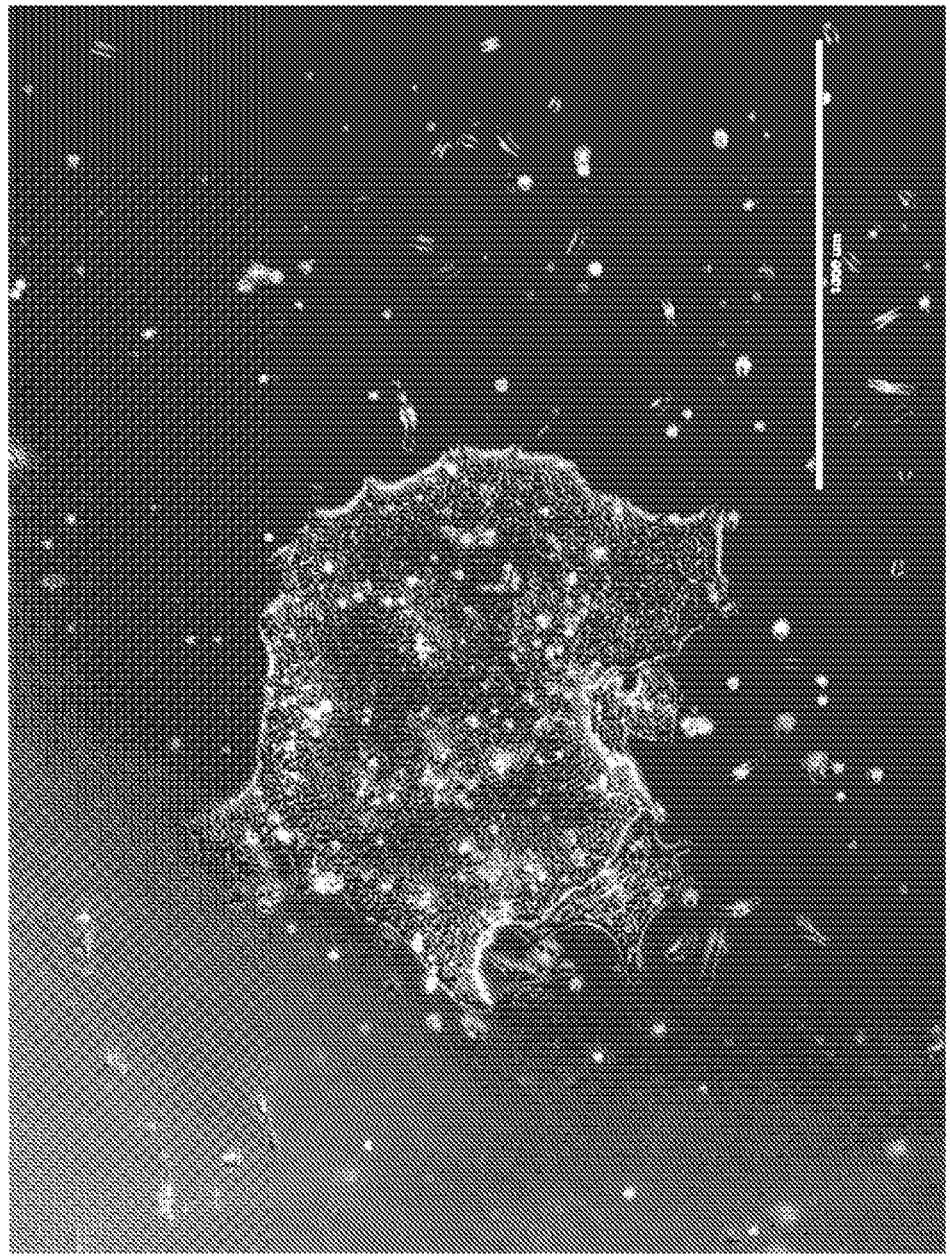
FIG. 13 is a microscopic image of cells prepared by the iPS cell preparation method of Example 4.
Figure 14:
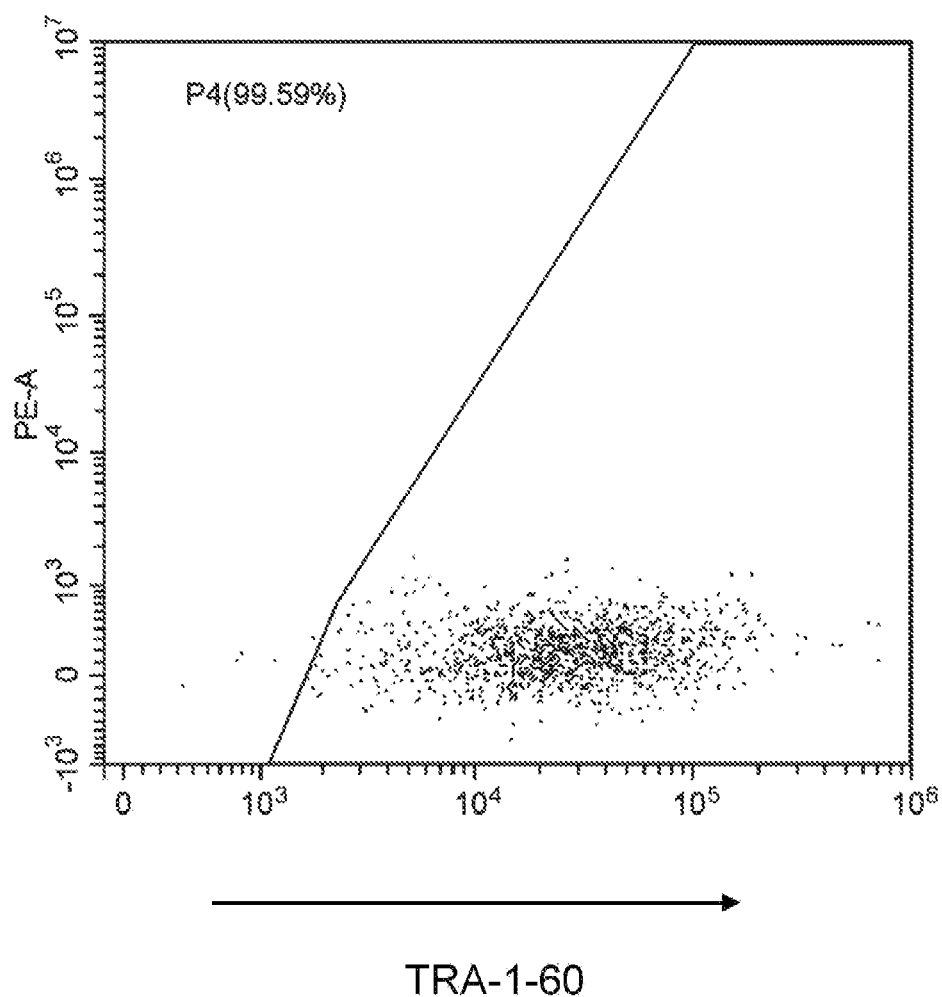
FIG. 14 is a histogram showing the results of flow cytometry analysis of cells prepared by the iPS cell preparation method of Example 4.

When the cells were observed under a microscope 15 days after addition of the Sendai virus to the blood growth medium, formation of ES cell-like colonies was confirmed as shown in FIG. 13. Cells were also fixed with 4% paraformaldehyde, and when the expressed amount of the cell surface antigen TRA-1-60 in the fixed cells was observed by flow cytometry, about 100% of the cells after induction were TRA-1-60 positive as shown in FIG. 14, confirming almost complete reprogramming. This shows that cells can be reprogrammed by introducing a reprogramming factor into cells in a cell culture vessel and culturing the cells with the introduced reprogramming factor in the same closed incubator.

Example 5

A non-gel, liquid blood growth medium was introduced into a laminin-coated 6-well dish and seeded with $2 \times 10^5$ blood cells (mononuclear cells). The 6-well dish was then placed in a 37° C. $CO_2$ incubator, and the blood cells were cultured for 7 days. A Sendai virus vector (CytoTune-iPS 2.0, ThermoFisher SCIENTIFIC) carrying OCT3/4, SOX2, KLF4 and cMYC was then added to the blood growth medium to a multiplicity of infection (MOI) of 5 to infect the blood cells with the Sendai virus.

Two days after addition of the Sendai virus to the blood growth medium, medium substitution was performed using 500 μl of stem cell medium (DMEM/F12 containing 20% KnockOut™ SR (ThermoFisher SCIENTIFIC)) or StemFit with the cells still in the 6-well dish.

Figure 15:
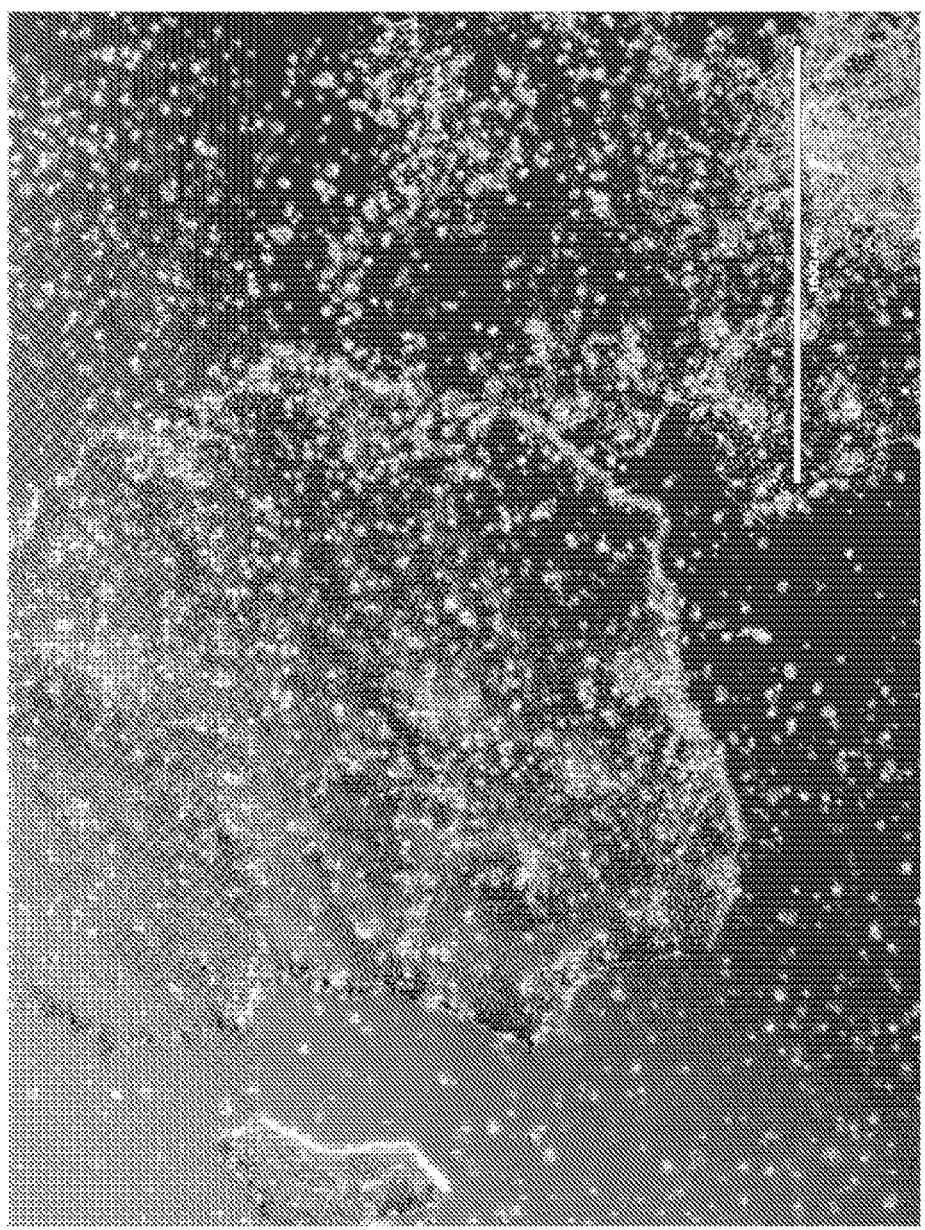
FIG. 15 is a microscopic image of cells prepared by the iPS cell preparation method of Example 5.
Figure 16:
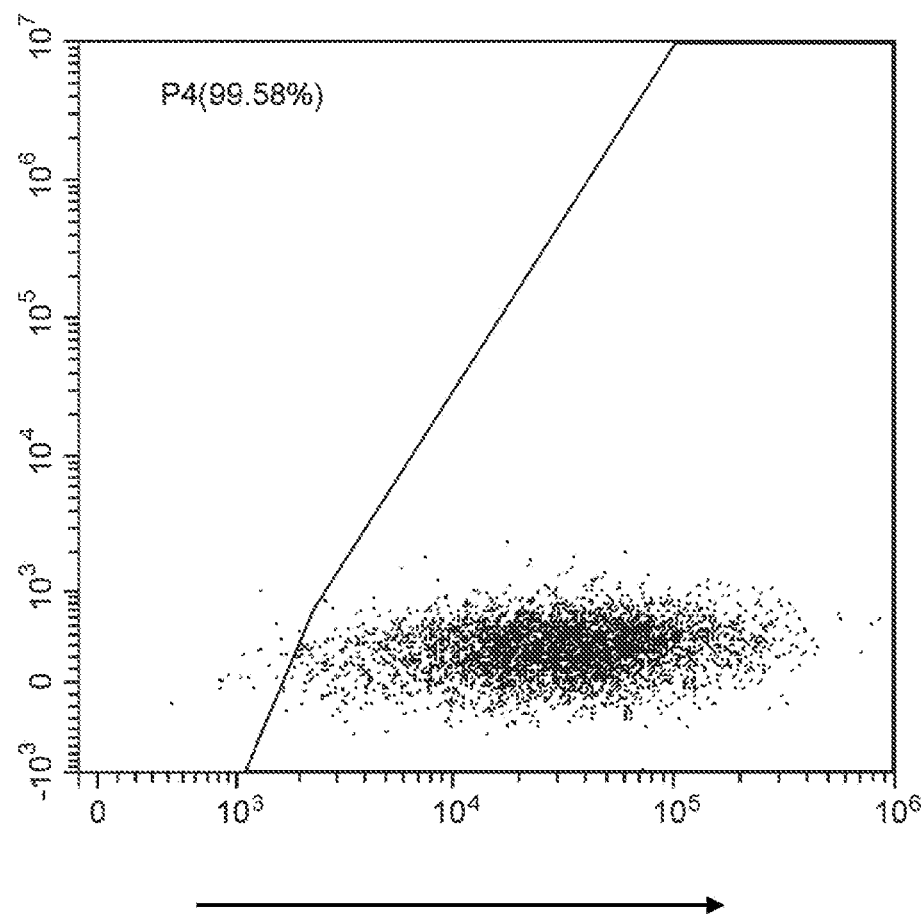
FIG. 16 is a histogram showing the results of flow cytometry analysis of cells prepared by the iPS cell preparation method of Example 5.

When the cells were observed under a microscope 15 days after addition of the Sendai virus to the blood growth medium, formation of ES cell-like colonies was confirmed as shown in FIG. 15. Cells were also fixed with 4% paraformaldehyde, and when the expressed amount of the cell surface antigen TRA-1-60 in the fixed cells was observed by flow cytometry, about 100, of the cells after induction were TRA-1-60 positive as shown in FIG. 16, confirming almost complete reprogramming. This shows that cells can be reprogrammed by introducing a reprogramming factor into cells in a cell culture vessel and culturing the cells with the introduced reprogramming factor in the same incubator.

Example 6

A non-gel, liquid blood growth medium was introduced into a laminin-coated flask and seeded with $5 \times 10^5$ blood cells (mononuclear cells). This was then placed in a 37° C. $CO_2$ incubator, and the blood cells were cultured for 7 days. A Sendai virus vector (CytoTune-iPS 2.0, ThermoFisher SCIENTIFIC) carrying OCT3/4, SOX2, KLF4 and cMYC was then added to the blood growth medium to a multiplicity of infection (MOI) of 5 to infect the blood cells with the Sendai virus.

Two days after addition of the Sendai virus to the blood growth medium, the flask was completely filled with stem cell medium (DMEM/F12 containing 20% KnockOut™ SR (ThermoFisher SCIENTIFIC)) or StemFit so that no air remained in the flask, and the flask cap was tightened to prevent gas exchange with the outside and close off the interior of the flask so that no cells, microorganisms, impurities, or the like could penetrate.

Figure 17:
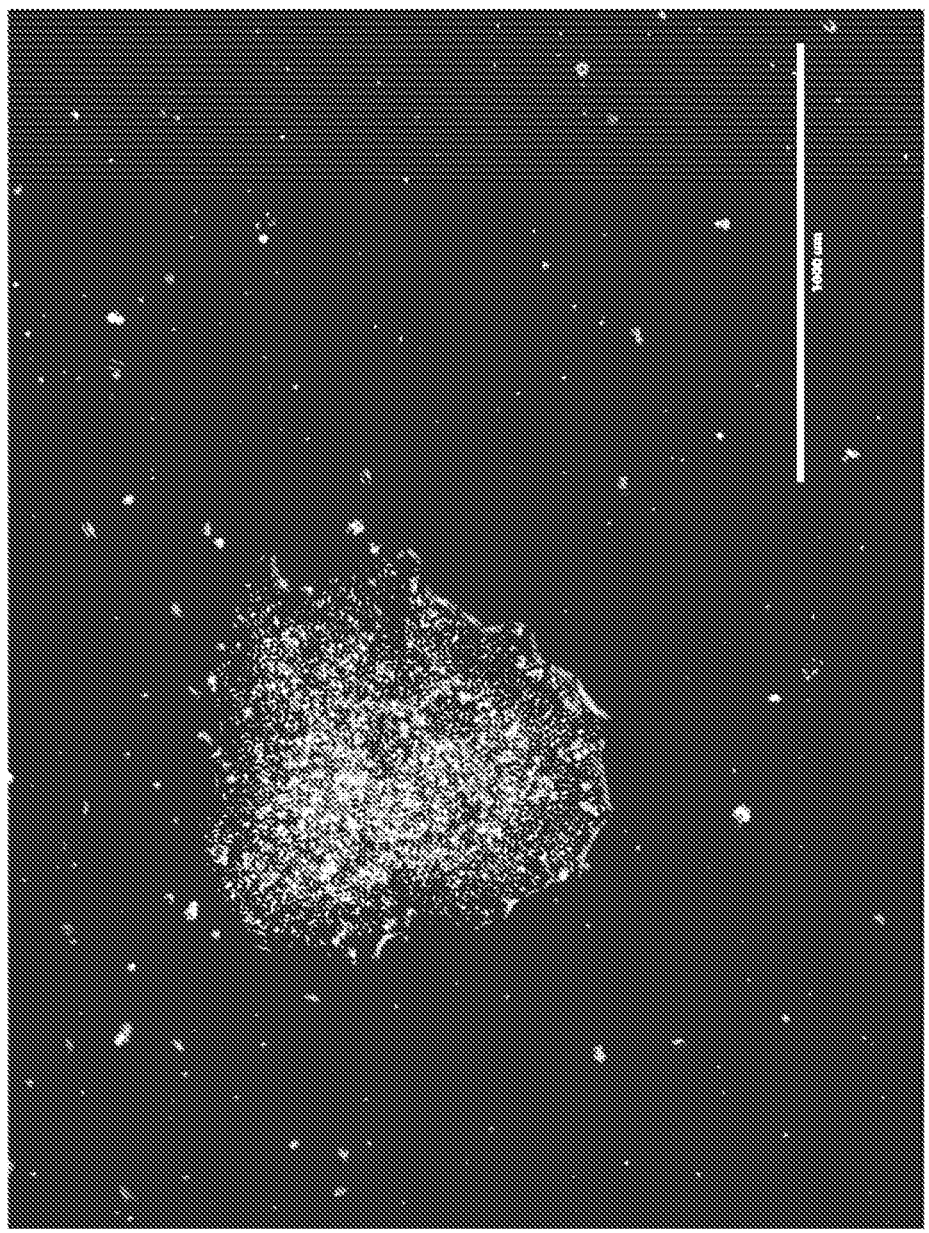
FIG. 17 is a microscopic image of cells prepared by the iPS cell preparation method of Example 6.
Figure 18:
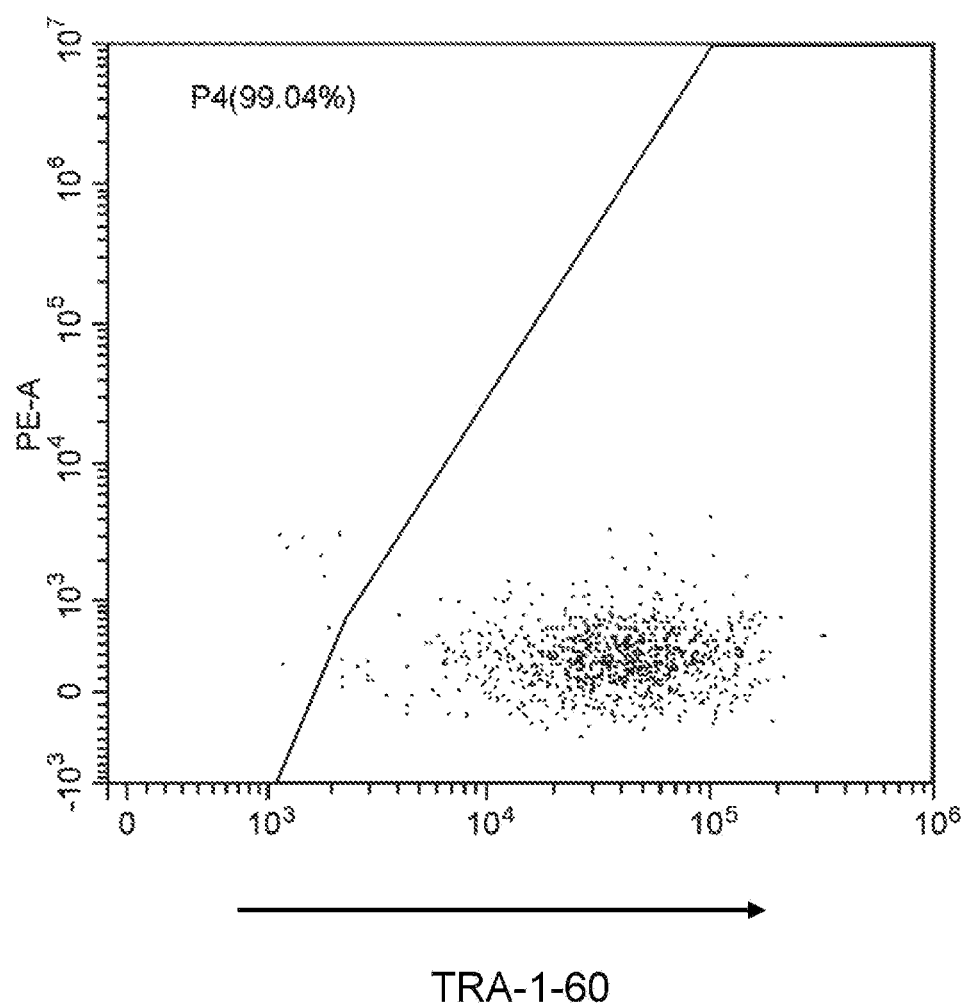
FIG. 18 is a histogram showing the results of flow cytometry analysis of cells prepared by the iPS cell preparation method of Example 6.

When the cells were observed under a microscope 15 days after addition of the Sendai virus to the blood growth medium, formation of ES cell-like colonies was confirmed as shown in FIG. 17. Cells were also fixed with 4% paraformaldehyde, and when the expressed amount of the cell surface antigen TRA-1-60 in the fixed cells was observed by flow cytometry, about 100% of the cells after induction were TRA-1-60 positive as shown in FIG. 18, confirming almost complete reprogramming. This shows that cells can be reprogrammed by introducing a reprogramming factor into cells in a cell culture vessel and culturing the cells with the introduced reprogramming factor in the same closed incubator.

REFERENCE SIGNS LIST

10 Blood container
11 Erythrocyte removal vessel
12 Flow channel
13 Flow channel
14 Fluid machinery
15 Mononuclear cell collector
16 Flow channel
17 Flow channel
18 Fluid machinery
19 Flow channel
20 Mononuclear cell suction device
21 Fluid machinery
22 Cell culture vessel
23 Flow channel
24 Fluid machinery
25 Culture medium container
26 Flow channel
27 Variable volume container
28 Fluid machinery
29 Flow channel
30 Variable volume container
31 Flow channel
32 Culture medium container
33 Fluid machinery
34 Flow channel
35 Variable volume container
36 Flow channel
37 Fluid machinery
38 Flow channel
39 Fluid machinery
40 Culture medium holding tank
50 Blood container
51 Flow channel
52 Fluid machinery
53 Erythrocyte treatment agent container
54 Flow channel
55 Fluid machinery
56 Flow channel
57 Mixer
58 Flow channel
60 Flow channel
61 Liquid diluent container
70 Vacuum container
71 Vacuum container
100 Erythrocyte removal device
101 Erythrocyte removal device
115 Opening
116 Opening
117 Flow channel
200 Cell culture device

What is claimed is:

1. A cell culture method comprising:
   introducing an induction factor into mononuclear cells in a cell culture vessel; and
   culturing the mononuclear cells into which the induction factor has been introduced in the same cell culture vessel until iPS cells are induced from the mononuclear cells into which the induction factor has been introduced,
   wherein the cell culture vessel is closed during the introducing and the culturing, and
   gas in the cell culture vessel is not exchanged during the culturing.

2. The cell culture method according to claim 1, wherein
   a variable volume container is connected to the cell culture vessel, and
   a fluid moves through the cell culture vessel and the variable volume container.

3. The cell culture method according to claim 2, wherein the induction factor is supplied from the variable volume container.

4. The cell culture method according to claim 1, wherein the induction factor is a reprogramming factor and comprises OCT3/4, SOX2, KLF4 and c-MYC.

5. The cell culture method according to claim 1, wherein the induction factor is contained in a plasmid vector or a virus vector.

6. The cell culture method according to claim 1, further comprising:
   collecting the iPS cells from the cell culture vessel; and
   returning the iPS cells to the same cell culture vessel to passage or expansion-culture the iPS cells.

7. The cell culture method according to claim 1, further comprising, prior to the introducing:
preparing the mononuclear cells by a method comprising:
at least partially removing erythrocytes from blood, thereby preparing treated blood;
diluting the treated blood;
causing sedimentation of mononuclear cells contained in the diluted treated blood;
removing a supernatant from the diluted treated blood; and
collecting the mononuclear cells.

8. The cell culture method according to claim 7, wherein
the treated blood is prepared in an erythrocyte removal vessel, and
the dilution of the treated blood, the sedimentation of the mononuclear cells and the removal of the supernatant are performed in a mononuclear cell collector, and the erythrocyte removal vessel and mononuclear cell collector are in a closed state.

9. The cell culture method according to claim 7, wherein the blood is treated with an erythrocyte sedimentation agent or erythrocyte removal agent.

10. The cell culture method according to claim 7, wherein at least either platelets or erythrocytes have been at least partially removed from the collected mononuclear cells.

11. The cell culture method according to claim 1, wherein a medium in the cell culture vessel is not exchanged during the culturing.

12. The cell culture method according to claim 11, wherein, during the culturing, an interior of the cell culture vessel is filled with the medium such that no air remains in the interior of the cell culture vessel, and carbon dioxide gas, nitrogen gas, and oxygen gas are not supplied to the interior of the cell culture vessel.

* * * * *